US006004020A

United States Patent [19]

Bartur

[11] Patent Number: 6,004,020

[45] Date of Patent: Dec. 21, 1999

[54] MEDICATION DISPENSING AND MONITORING SYSTEM

[76] Inventor: Meir Bartur, 11601 Terryhill Pl., Los Angeles, Calif. 90049

[21] Appl. No.: 08/872,948

[22] Filed: Jun. 11, 1997

[51] Int. Cl.[6] .............................. G06F 17/00; G06F 7/00; G07F 7/00

[52] U.S. Cl. ................................ 364/479.06; 364/479.03; 364/479.12; 364/479.14; 221/2; 221/13; 221/123

[58] Field of Search ......................... 364/479.01, 479.02, 364/479.03, 479.04, 479.06, 479.11, 479.12, 479.14; 221/2, 3, 7, 9, 13, 15, 122, 123, 124, 129, 131, 265, 266, 277, 130, 132

[56] References Cited

U.S. PATENT DOCUMENTS

| | | | |
|---|---|---|---|
| 4,473,884 | 9/1984 | Behl | 364/479 |
| 4,490,963 | 1/1985 | Gutman et al. | 340/313 |
| 4,598,379 | 7/1986 | Awane et al. | 364/479.02 |
| 4,783,747 | 11/1988 | Komori et al. | 364/479.14 |
| 4,875,038 | 10/1989 | Siwiak | 340/825.44 |
| 4,928,096 | 5/1990 | Leonardo | 340/825.44 |
| 4,984,709 | 1/1991 | Weinstein | 211/7 |
| 4,991,740 | 2/1991 | Levasseur | 221/114 |
| 5,153,582 | 10/1992 | Davis | 340/825.44 |
| 5,200,891 | 4/1993 | Kehr et al. | 221/15 |
| 5,221,024 | 6/1993 | Campbell | 221/15 |
| 5,329,459 | 7/1994 | Kaufman et al. | 364/479.11 |
| 5,361,937 | 11/1994 | Wiese | 221/130 |
| 5,412,372 | 5/1995 | Parkhurst et al. | 221/15 |
| 5,463,382 | 10/1995 | Nikas | 340/825.44 |
| 5,481,255 | 1/1996 | Albert | 340/825.55 |
| 5,583,831 | 12/1996 | Churchill | 368/10 |
| 5,596,318 | 1/1997 | Mitchell | 340/825.44 |
| 5,611,456 | 3/1997 | Kasper | 221/131 |
| 5,657,236 | 8/1997 | Conkright | 364/479.14 |
| 5,699,328 | 12/1997 | Ishizaki et al. | 364/479.01 |
| 5,703,786 | 12/1997 | Conkright | 364/479.14 |
| 5,710,551 | 1/1998 | Ridgeway | 364/479.01 |
| 5,713,485 | 2/1998 | Life et al. | 364/479.01 |
| 5,752,621 | 5/1998 | Passamante | 221/13 |
| 5,797,515 | 8/1998 | Life et al. | 364/479.11 |
| 5,805,051 | 9/1998 | Herrmann et al. | 221/2 |
| 5,826,217 | 10/1998 | Lerner | 364/479.12 |
| 5,831,860 | 11/1998 | Foldare et al. | 364/479.01 |

*Primary Examiner*—William E. Terrell
*Assistant Examiner*—Wonki K. Park
*Attorney, Agent, or Firm*—Graham & James LLP

[57] ABSTRACT

A medication dispensing and monitoring system includes an acknowledge-back pager, a carriage communicating with the pager, and a medication unit dispensing stored medication. The pager receives prescriptions and transmits messages back to a physician or health care organization. Prescriptions received by the pager are stored and processed by a pager processor. The pager processor communicates with a carriage controller via a series of electrical contacts. At a prescribed time, a motor in the carriage causes the medication unit to dispense the prescribed medication. Numerous medication units may be assembled to accommodate different forms of medication.

17 Claims, 26 Drawing Sheets

MEDICATION DISPENSING AND MONITORING SYSTEM

BACKGROUND OF THE INVENTION

1. Field of the Invention

The present invention relates to systems and methods for medication dispensing and monitoring. More particularly, the present invention is directed to systems and methods for patient medication compliance assistance and monitoring.

2. Background

Each year, numerous patients are admitted to hospitals for complications resulting from medication non-compliance. Statistics indicate that over one-third of elderly patients admitted to hospitals are admitted due to some form of medication non-compliance. Among the most frequently cited reasons for non-compliance are failing to take the proper medication or combination of medications, administering the incorrect dosage, and forgetting to take the medication altogether. For certain minor illnesses, failing to take medication may result in mild discomfort that may be treated on an outpatient basis. For more serious illnesses, however, medication non-compliance can result in long-term hospital care and/or death.

In addition, failure to follow a prescribed treatment ultimately may make the virus or bacteria resistant to treatment and create a potential health risk by creating drug-resistant strains of the disease. Human Immunodeficiency Virus ("H.I.V") infection is one example of an illness requiring strict adherence to prescribed medications. Unfortunately, adhering to a typical H.I.V. drug regimen is often easier said than done. For instance, in a recent article, one patient described his daily medication schedule as follows: At 8:30 a.m., the patient must take two pills of Crixivan. At 10:30 p.m., the patient takes one pill each of Zerit, Epivir, and Blaxin. At 2:30 p.m., he must take one pill each of Prednisone, Zovirax, Bactrim, and a prescribed multivitamin. At 4:30 p.m., the patient takes two additional Crixivan pills. At 10:30 a.m., he takes one pill each of Zerit, Epivir, and Biaxin. Finally, at 12:30 a.m., the patient must take two more Crixivan pills. In addition, certain pills must be taken with food while other pills may not be taken with food. Needless to say, following such a complicated drug regimen can be a difficult task.

One cause of medication non-compliance are drug labels that are difficult to read, particularly for those with vision problems. Although the label print size may be increased, even large-print labeling does not improve compliance if the patient forgets the overall drug regimen. Acknowledging the problems of non-compliance and poor labelling, some physicians have attempted to remotely notify patients using an audible beeper. The audible beeper, however, is not very useful in reminding patients which drugs to take, the proper dosage of those drugs, and whether or not food must be taken with the drug. Moreover, the patient usually has no method to remotely respond to the physician. Thus, the physician has no way of knowing whether or not the patient has complied with the drug regimen.

Various systems have been proposed to address the problem of patient medication compliance but such systems fail to provide a complete or practical solution to the problem. For example, U.S. Pat. No. 4,473,884 to Behl, issued Sep. 25, 1984, describes a programmable medication system for storing and dispensing pills. The system includes a dispensing unit with numerous compartments for storing pills. Each compartment is associated with an indicator. The unit further includes a memory for storing a medication regimen. At the appropriate time, an audible alarm and the visual indicator remind the patient that a particular drug must be taken. The Behl device has several drawbacks, however. First, the system, itself, is very complicated, requiring the patient (or physician or pharmacist) to program in the regimen using a multi-key, multi-light control panel. Second, the device cannot be remotely programmed. Once the device leaves the control of the physician or pharmacist, only the patient can physically alter the regimen. Third, the device places no limit on the individual number of pills that a patient may take. Thus, compliance is still not assured. Finally, the dispensing unit dispenses a fixed number of different medications. If the patient requires more than four different types of medication, she must remember to administer this medication manually.

U.S. Pat. No. 5,583,831 to Churchill, issued Dec. 10, 1996 discloses a memory assistance device that reminds a patient to take a particular medication. The device includes three separate units: a reminder unit, a compliance processor, and a supervisory unit. The reminder unit includes a microprocessor, a memory, an input key, and an alarm to remind to audibly remind the patient to administer the medication. The compliance processor includes a CPU, a pill case, and a modem. Data on user compliance or non-compliance is stored in the compliance processor and sent to the supervisory unit via modem. The Churchill device, however, includes only a single pill case. Thus, the patient cannot be reminded to take several different medications. In addition, the Churchill apparatus provides only limited response by the patient to the physician. The patient cannot notify the physician of contraindications and/or side effects. Further, the Churchill device is stationary, thereby restricting the patient to his/her home or ward.

Accordingly, a need presently exists for a solution to the medication compliance problem. In particular, a need exists for a remote medication dispensing system that stores a complex drug regimen and reminds patients to comply with medication requirements.

Further, a need exists for a medication dispensing system that monitors medication compliance.

Further, a need exists for a medication dispensing system that allows patients to notify or respond to physicians or pharmacists about contraindications or side effects.

Further, a need exists for a medication dispensing system that can hold many different types of medication.

SUMMARY OF THE INVENTION

The present invention is directed to a medication dispensing and monitoring system which addresses the medication compliance problems. In a preferred embodiment, the system of the present invention includes a two-way or acknowledge-back pager for communication between a patient, a physician, a health care organization, a pharmacist, and/or a drug supplier. The pager sits in a carriage and communicates with the carriage via a series of electrical contacts or similar methods. The carriage is coupled to one or more medication units that dispense stored medication. The medication units may be combined to create a dispensing assembly. Each medication unit includes a canister storing medication and a base medication dispenser engaged with the canister. The pager and carriage include circuitry for receiving a prescription. At the prescribed times, the pager alerts the patient that medication must be taken. The patient may place the pager on the carriage and manually move the carriage to the appropriate medication unit under control of the pager. A motor disposed within the carriage causes the dispenser to dispense medication from the canister into a dispensing cavity. The patient may then retrieve the dispensed medication from the cavity.

The present invention satisfies the need for a solution to the medication compliance problem. Specifically, the present invention uses the pager memory to store complex drug regimens and prescriptions. These regimens may be downloaded to the pager from a physician and/or health care organization located in a remote location. The need for a system allowing patient notification is also satisfied by the present invention. Patients may send a message back to the physician or health care organization confirming medication compliance. Similarly, the pager may be programmed to reply to the physician when the patient fails to comply with a particular prescription. Finally, the system does not limit the number of different medications that may be taken by the patient. Rather, the present invention allows the coupling of numerous medication units. In addition, the canisters of varying sizes may be used to accommodate different forms of medication.

A more complete understanding of the medication dispensing and monitoring system will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

Reference will now be made in detail to the preferred embodiments of the invention, examples of which are illustrated in the accompanying drawings. Whenever possible, the same reference numbers will be used throughout the drawings to refer to the same or like parts.

Figure 1A:
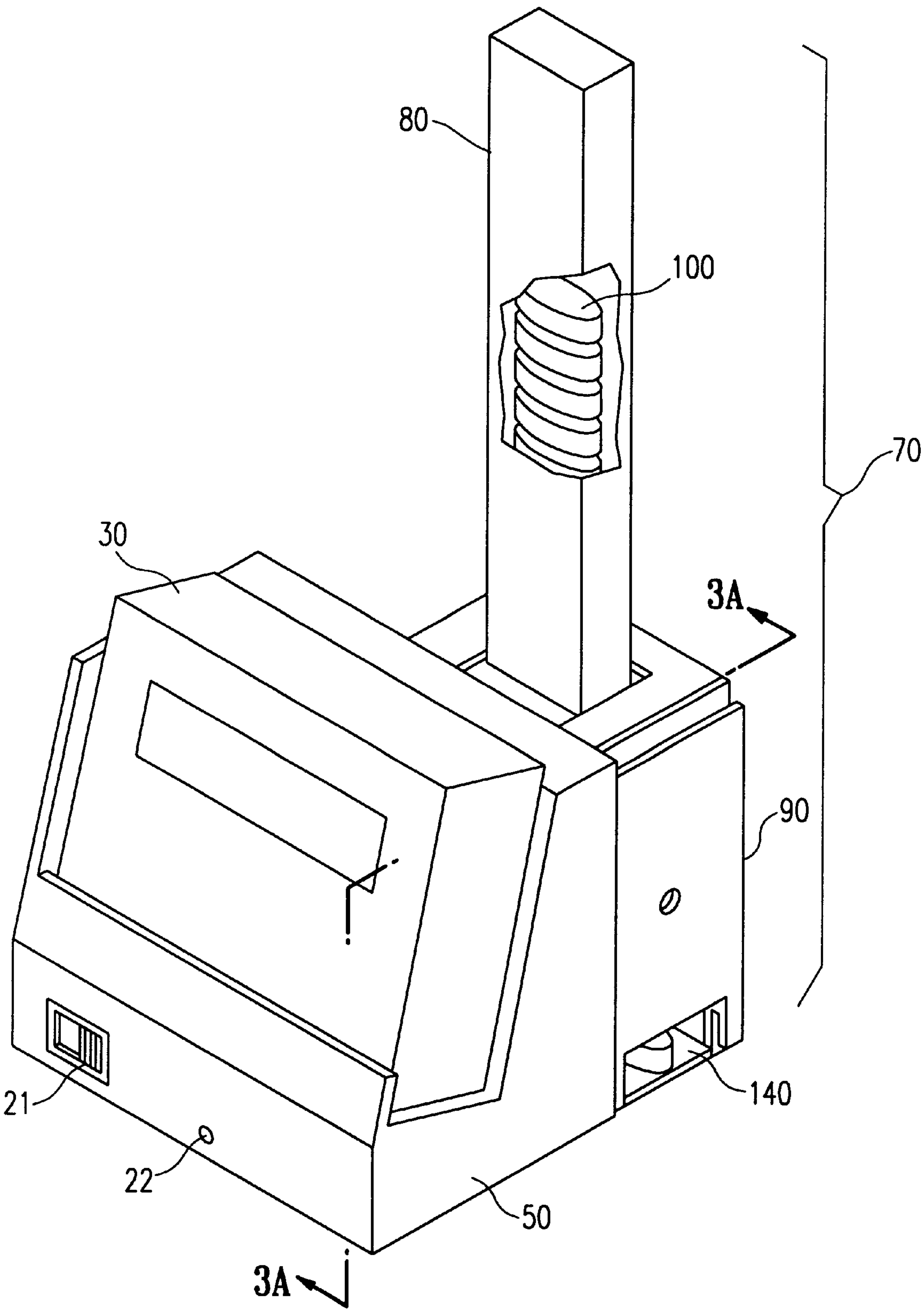
FIG. 1A is a perspective view of the remote medication dispensing and monitoring system of the present invention.
Figure 1B:
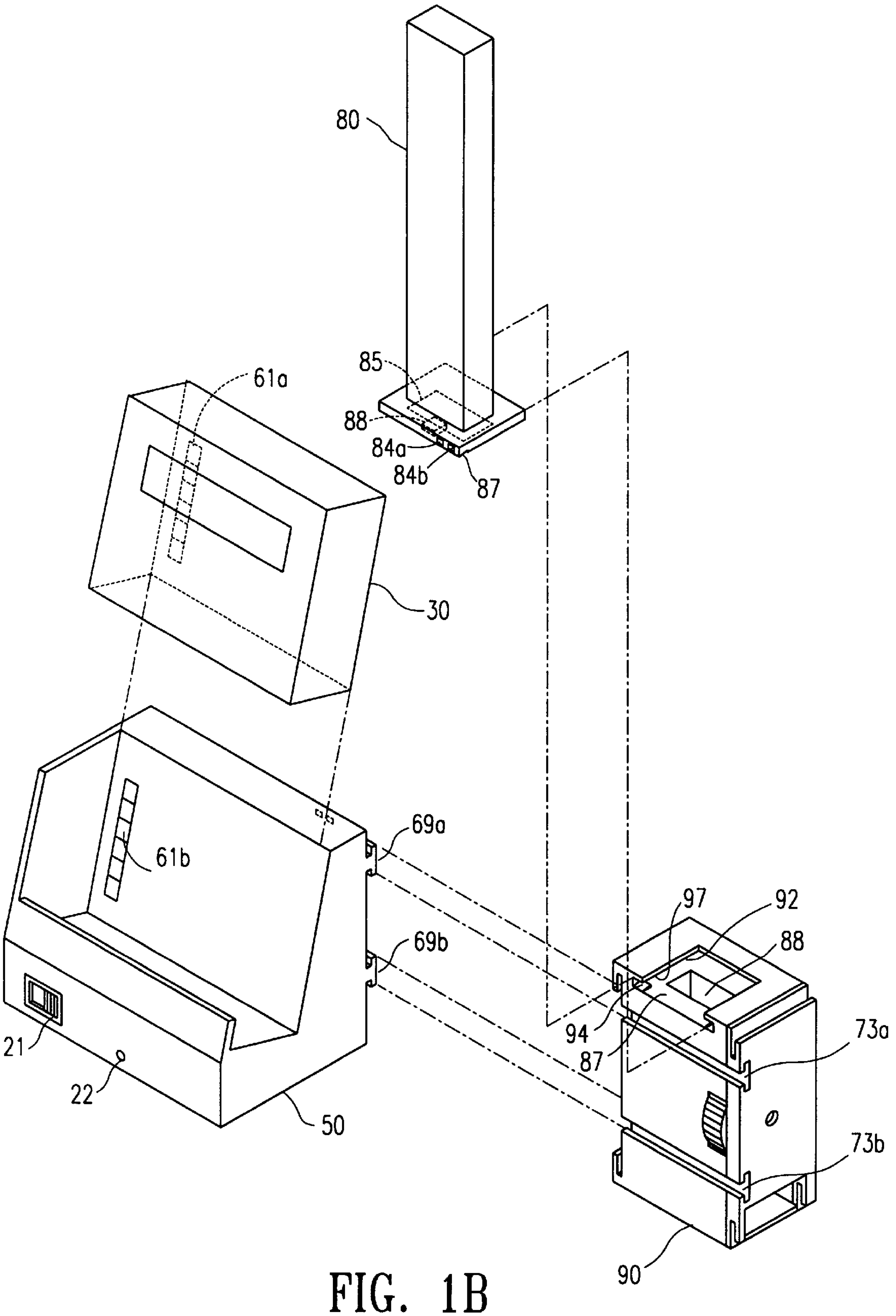
FIG. 1B is an exploded view of the medication unit, carriage, and pager of FIG. 1A.

As illustrated in FIGS. 1A and 1B, a remote medication dispensing and monitoring system 20 of the present invention includes a pager 30 for remote communication. The pager 30 is a portable communication device designed to receive packet messages via radio-frequency transmission through paging networks. The paging networks transmit messages such that the messages may only be received by a target device. Each message transmission may be time-delayed to reduce the overall load on the network. Messages may include alphanumeric characters and/or symbols. In the present invention, alphanumeric messages may be transmitted to a patient to remind the patient to take a particular medication. As discussed in greater detail below, in lieu of transmission of a medication message, a schedule or prescription message may be transmitted and stored in a memory of the pager.

In one-way paging networks, pagers are receive-only devices and, therefore, cannot transmit a message to the sender acknowledging and responding to receipt of a message. A portion of the radio spectrum has been allocated for Narrowband Personal Communication Services (“PCS”). Pager providers are using part of the allocated spectrum to provide two-way (or “acknowledge-back”) paging services. The presence of a transmitter in the pager allows the pager to positively acknowledge the receipt of each message and transmit short messages from the pager to the paging network. Such acknowledge-back pagers become a time-shifted packet-based RF data communicator. Current devices, such as the pager sold under the trade name SkyWriter from SkyTel Corp., permit the composition and transmission of a message by the pager. Users of such devices also may receive and transmit electronic mail via the Internet.

As shown in FIG. 1B, the pager 30 enables communication between a patient, a physician, a medical care organization, a drug supplier, and/or a pharmacist. The system 20 further includes a carriage 50 for holding the pager 30 and a medication unit 70 for dispensing medication. The pager 30 may be slidably engaged with the carriage 50 and, as discussed in greater detail below, communicates with the carriage via a series of electrical contacts 61*a*, 61*b*. The carriage 50 includes rails 69*a*, 69*b* that are slidably engaged with and move along grooves 73*a*, 73*b* disposed longitudinally along the length of the medication unit 70.

Figure 2A:
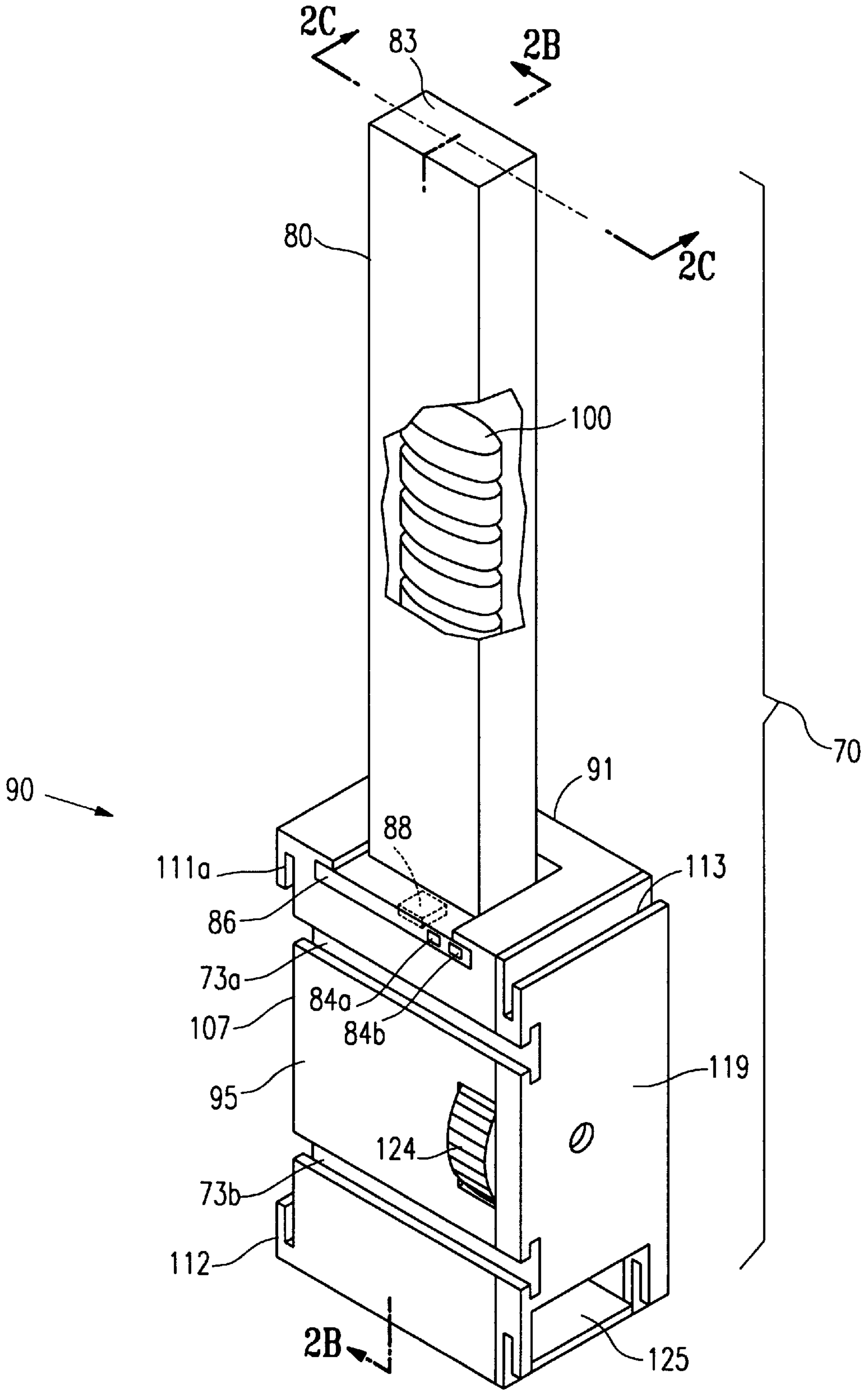
FIG. 2A is a front perspective view of the medication unit and canister.

FIG. 2A is a front perspective view of the medication unit 70 used for storing and dispensing medication 100, such as a tablet or pill, to the patient. As shown, the medication unit 70 includes a canister 80 slidably coupled to a base dispenser 90. The canister 80 is a holder or container composed of cardboard or a thin transparent plastic or similar material, with a rigid base 86. The canister housing holds a group of stacked pills or tablets 100. Although the canister 80 illustrated in FIG. 2A is rectangular, the canister 80 may be also formed to accommodate pills having different shapes. For instance, a cylindrically-shaped canister may be used to hold round tablets. The height of the canister 80 is variable depending upon the number of tablets that it is designed to hold. An upper end 83 of the canister 80 is closed, while a canister base 86 includes an opening 85 (see FIG. 1B) for accessing the medication 100. A removable plastic seal (not shown) may be used to seal the opening 85 for storage and humidity control prior to engaging with the base 90. The opening 85 is preferably formed in the shape of the inside cavity of the canister 80 to fit the medication 100 held therein. The canister base 86 is formed so as to slidably engage an upper surface 97 of a recess 92 formed within the base dispenser 90.

A silicon ID chip 88 may be embedded into the canister base 86, connected to at least two contacts 84*a*, 84*b*, at a fixed distance from a side surface of the canister. A medication identifier encoded into the ID chip 88 specifies the medication stored by the canister 80. Any known encoding scheme may be utilized. The chip 88 is electrically coupled to one or more chip contacts 84*a*, 84*b*. The chip 88 may be a DS2401 chip manufactured by Dallas Semiconductors. This chip contains unique factory-lasered and tested 64-bit word information, does not require a separate battery, and may be interrogated without power by a single port of a microprocessor via two line connections at rates of up to 16.3 kilobits per second. The same communication methodology may be utilized to communicate with an ID chip containing non-volatile random access memory ("NVRAM") (e.g., the DS1991 or DS1996 NVRAM components by Dallas Semiconductors) or erasable programmable read-only memory ("EPROM") (e.g., the DS1896 EPROM manufactured by Dallas Semiconductors). As discussed in greater detail below, the chip enables pharmacists to encode a specific identifier and/or instructions prior to issuing the medication. Moreover, consumption of medication may be stored in the NVRAM to enable multiple users to dispense medication from the same medication unit.

The medication unit 70, as described herein, may be loaded by the patient/end-user or may be pre-loaded by the drug supplier/packaging facility. If the user loads the medication unit 70, the filled canister 80 is packed and provided to the patient. Either the patient or a health care worker, such as a pharmacist, may insert the canister 80 into the base dispenser 90. Upon consumption of all of the medication within the canister 80, the canister may be replaced by a new filled canister or may be recycled.

Figure 2B:
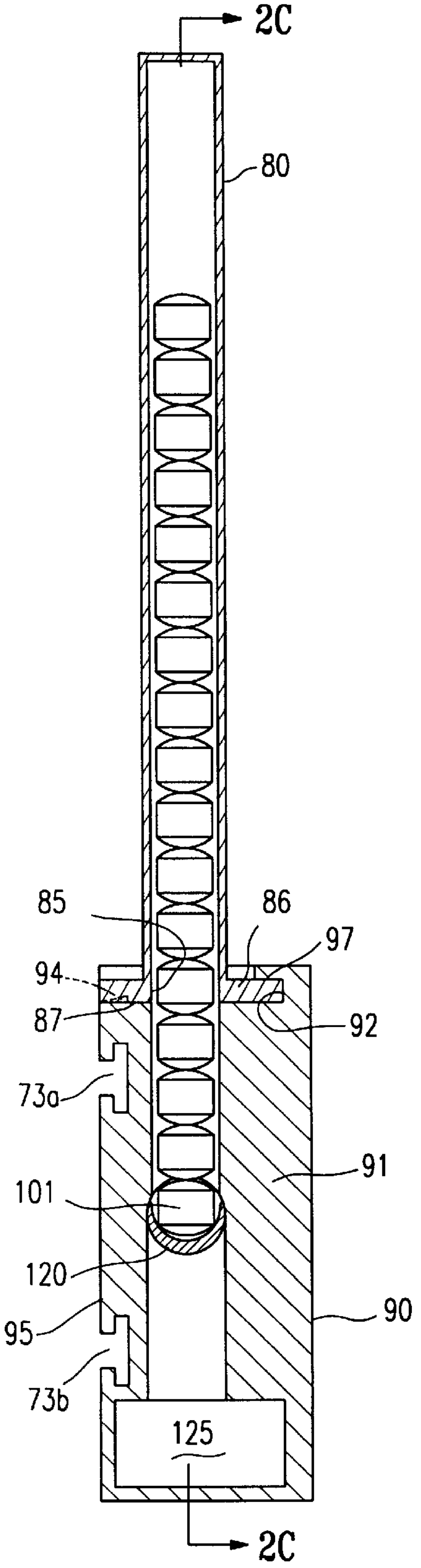
FIG. 2B is a side cut-away view of the medication unit.

If the unit is pre-loaded by the drug supplier, the supplier hermetically seals the unit in plastic wrap or similar material to isolate the unit from humidity and other moisture. Prior to pre-loading, the canister 80 is placed upside-down and filled to its total length with pills or tablets. To maximize the amount of pills stored by the medication unit 70, the base dispenser 90 may also be filled with medication. A thin separator (not shown) is then placed on the canister base 86 and the canister 80 is placed on the base dispenser 90. The thin separator is removed and the loaded unit is packaged for shipment to the patient. Upon consumption by the patient, the complete medication unit 70 may be disposed or returned to the drug distributor/packaging facility for recycling. In FIG. 2B, for example, four pills are pre-supplied to the base dispenser 90. As explained above, the drug distributor will then completely fill the canister 80 and couple the canister 80 to the base dispenser 90.

Figure 2C:
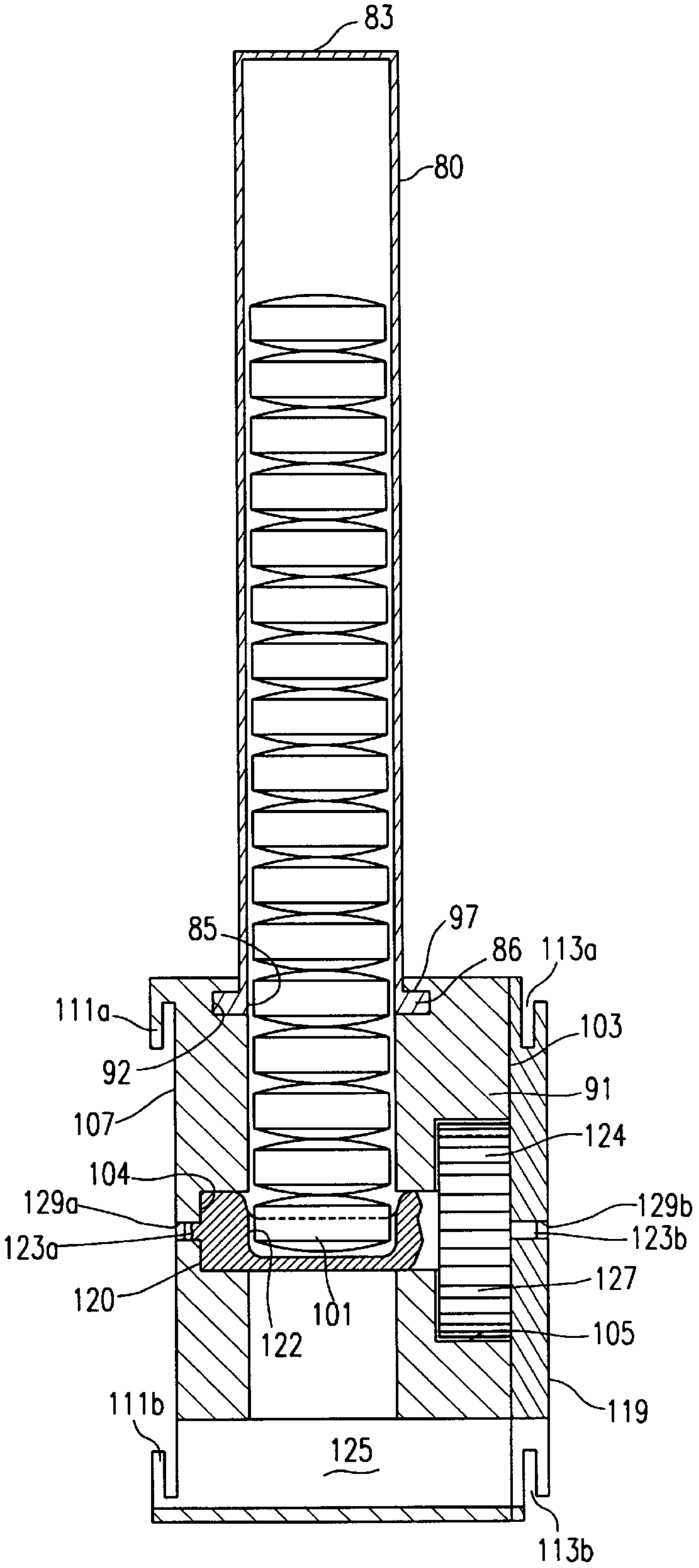
FIG. 2C is a front cut-away view of the medication unit.
Figure 2D:
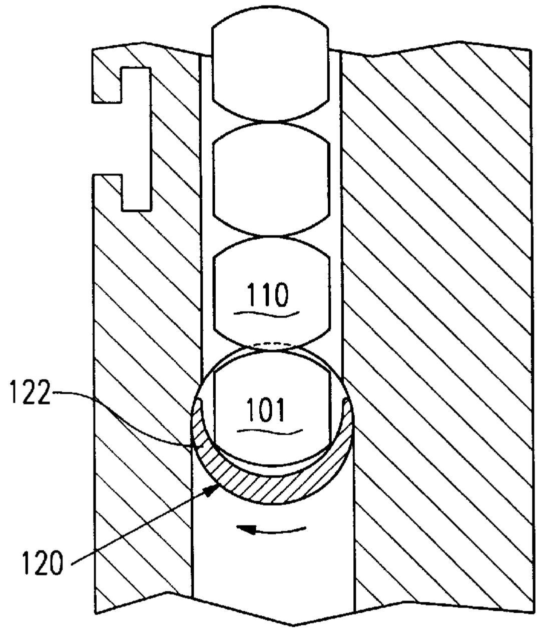
FIG. 2D is an enlarged side cut-away view of the medication unit in a pre-dispensing position.
Figure 2E:
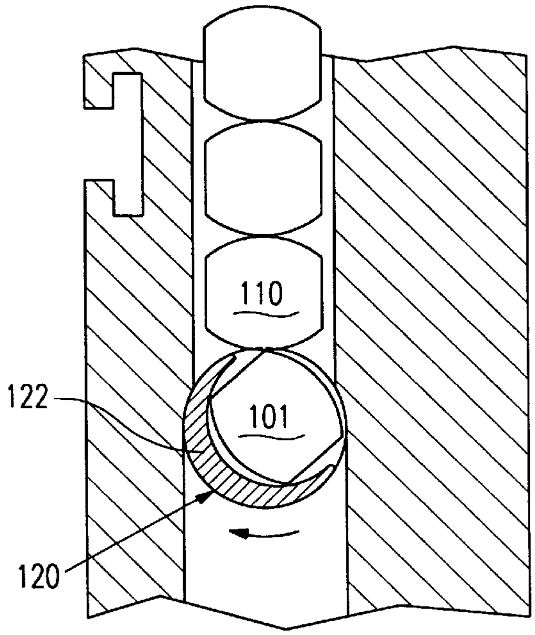
FIG. 2E is an enlarged side cut-away view of the medication unit in a dispensing position.

FIGS. 2B–2C show the medication unit 70 in greater detail. The base dispenser 90 includes a housing 91 composed, for example, of a lightweight plastic material. The housing 91 includes an upper surface 97 having a recess 92 formed therein. As discussed above, the recess 92 accommodates the canister base 86. The base dispenser 90 further includes a front surface 95 having a plurality of grooves 73*a*, 73*b* formed therein. Each groove 73*a*, 73*b* is a T-shaped depression integrally formed within the base dispenser 90. The grooves 73*a*, 73*b* accommodate the carriage rails 69*a*, 69*b*. A first side surface 103 (see FIG. 2C) includes a circular drum recess 105 formed therein. The drum recess 105 accommodates a rotating delivery drum actuator 124, as discussed below. An entrance 140 to a dispensing cavity 125 is formed beneath the drum recess 105. To facilitate the coupling of multiple medication units, the base dispenser may include upper and lower flanges 111*a*, 111*b* extending from a second side surface 107. A coupling bracket 119 is rigidly coupled to the first side surface of the dispenser 90. The coupling bracket 119 includes upper and lower grooves 113*a*, 113*b* for slidably engaging the flanges 111*a*,111*b* from an adjacent unit. A plurality of grooves are formed within the coupling bracket 119 to extend the grooves 73*a*, 73*b* of the base dispenser 90. The coupling bracket may be designed to vertically engage an adjacent medication unit. For example, the coupling bracket may include a vertically extending dove tail groove. The base dispenser may include a tongue or similar structure for coupling with the groove. Thus, lateral movement of an attached medication unit may be prevented.

FIG. 2B is a side cut-away view of the medication unit 70. As shown, the canister base 86 engages an upper surface 97 of the base dispenser recess 92. A lower surface 87 of the base dispenser recess 92 further includes an angled notch 94 engaging the recess 84 in the canister base 86, thus preventing the canister 80 from being easily removed. Once installed, the medication are fed from the canister 80 and stacked atop a delivery drum 120. The canister 80 may include an optional spring 89 (see FIG. 14) disposed therein proximate the upper end 83 of the canister. The spring places an additional force on the medication 100 to push the column of pills or tablets down and, thereby, prevent sticking or clumping of tablets or pills. Medication is dispensed into a dispensing cavity 125. Specifically, a single pill or tablet is dispensed per each revolution of the delivery drum 120. The dispensing cavity 125 is a hollow opening within the base dispenser 90 located beneath the delivery drum 120.

The dispensing cavity 125 is large enough to permit the patient to manually retrieve the dispensed medication 100 by tilting the medication unit 70 to one side.

FIG. 2C is a front cut-away view of the base dispenser 90. As shown, the medication 100 is gravity-fed from the canister 80. The bottom-most pill or tablet 100 sits within a delivery drum 120. The delivery drum 120 includes a delivery drum housing 122 and a delivery drum actuator 124. The delivery drum housing 122 is a hollow rotatable cylinder with an opening for receiving a single piece of medication. The delivery drum housing 122 lies flush against an inner side surface 104 of the base dispenser 90 or has short axles 123*a,* 123*b* within holes 129*a,* 129*b* in the base 91 and the coupling bracket 119, respectively. The drum housing 122 is coupled to the circular delivery drum actuator 124. The delivery drum actuator 124 is a circular member with a saw-tooth outer surface 127. The outer surface 127 includes a plurality of serrations that may be manually or mechanically used to rotate the actuator 124 and, thereby, rotate the delivery drum 120.

Figure 2F:
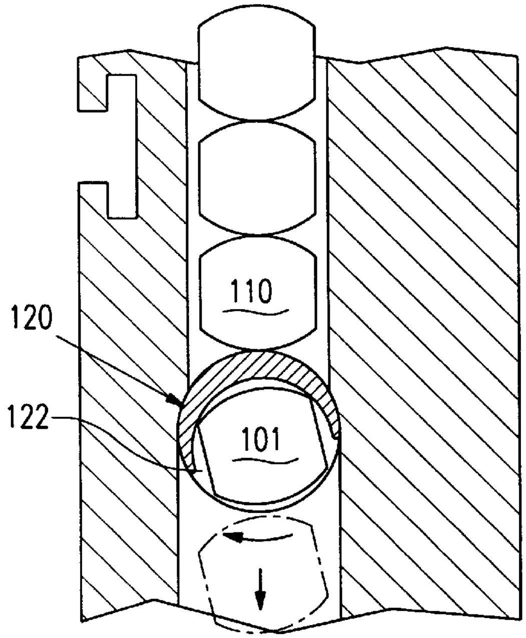
FIG. 2F is an enlarged side cut-away view of the medication unit in a post-dispensing position.
Figure 2G:
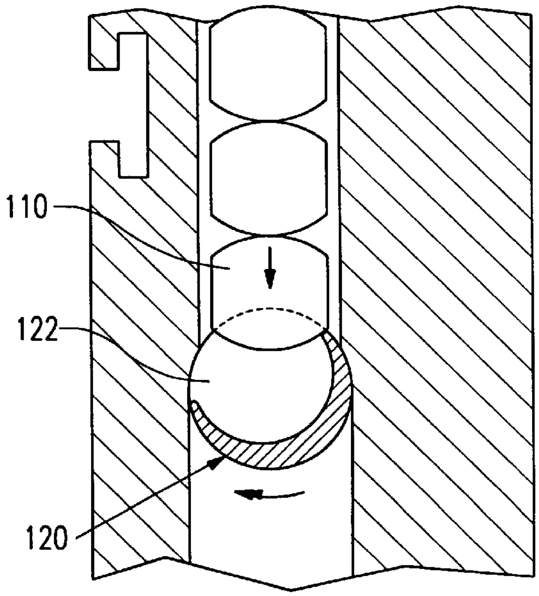
FIG. 2G is an enlarged side cut-away view of the medication unit in an empty position.
Figure 2H:
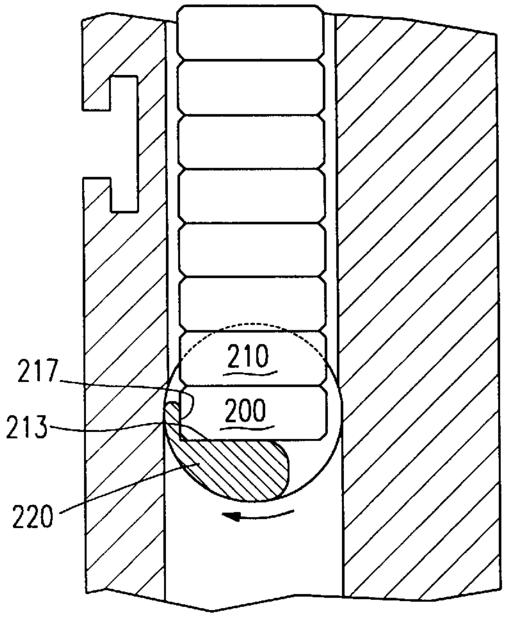
FIG. 2H is an enlarged side cut-away view of the medication unit in a pre-dispensing position.
Figure 2I:
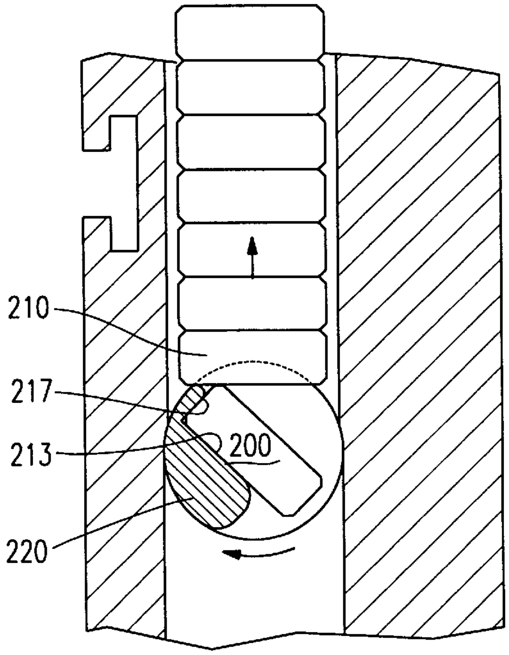
FIG. 2I is an enlarged side cut-away view of the medication unit in a dispensing position.
Figure 2J:
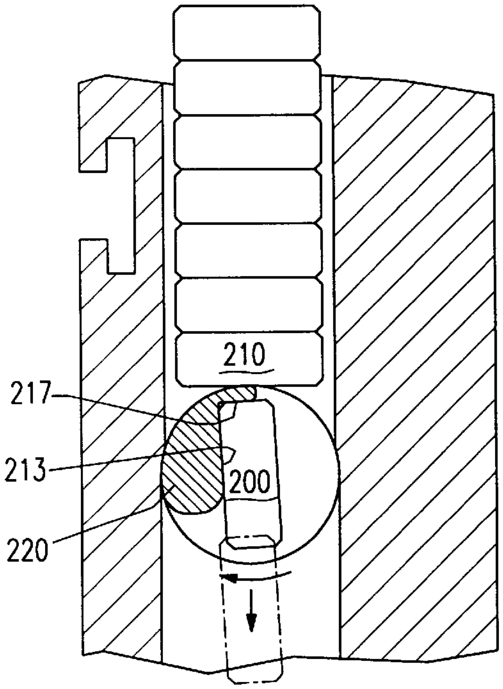
FIG. 2J is an enlarged side cut-away view of the medication unit in a post-dispensing position.
Figure 2K:
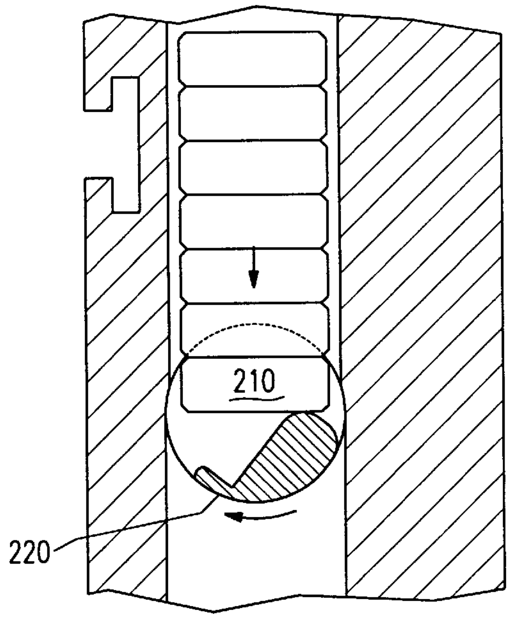
FIG. 2K is an enlarged side cut-away view of the medication unit in an empty position.

FIGS. 2D–2G illustrate the dispensing of a particular shape of medication from the delivery drum 120. In the pre-dispensing position, a single medication 101 is held in the delivery drum housing 122. When the delivery drum actuator 124 (see FIG. 2C) is rotated, the delivery drum housing rotates into the position shown in FIG. 2E. As the delivery drum 120 continues to rotate, the medication 110 disposed atop the dispensing medication 100 is moved into a pre-dispensing position. The dispensing medication 100 located in the housing 122 is then gravity-fed into the dispensing cavity 125 disposed beneath the delivery drum 120 as shown in FIG. 2F. The next pill 110 is then gravity fed into the delivery drum housing 122 for dispensing.

FIGS. 2H–2K illustrate the dispensing of a round pill with a square-shaped cross-section. As shown, the shape of the delivery drum 220 may be altered to accommodate the various shapes and sizes of medication. The single medication 200 now rests along inner surfaces 213, 217 of the delivery drum 220. The mechanics of the delivery drum 220, however, remain the same. Thus, rotation of the delivery drum actuator (not shown) causes a corresponding rotation of the delivery drum 220. As the delivery drum 220 turns, the medication 200 falls into the dispensing cavity 125 for receipt by the patient.

Figure 3A:
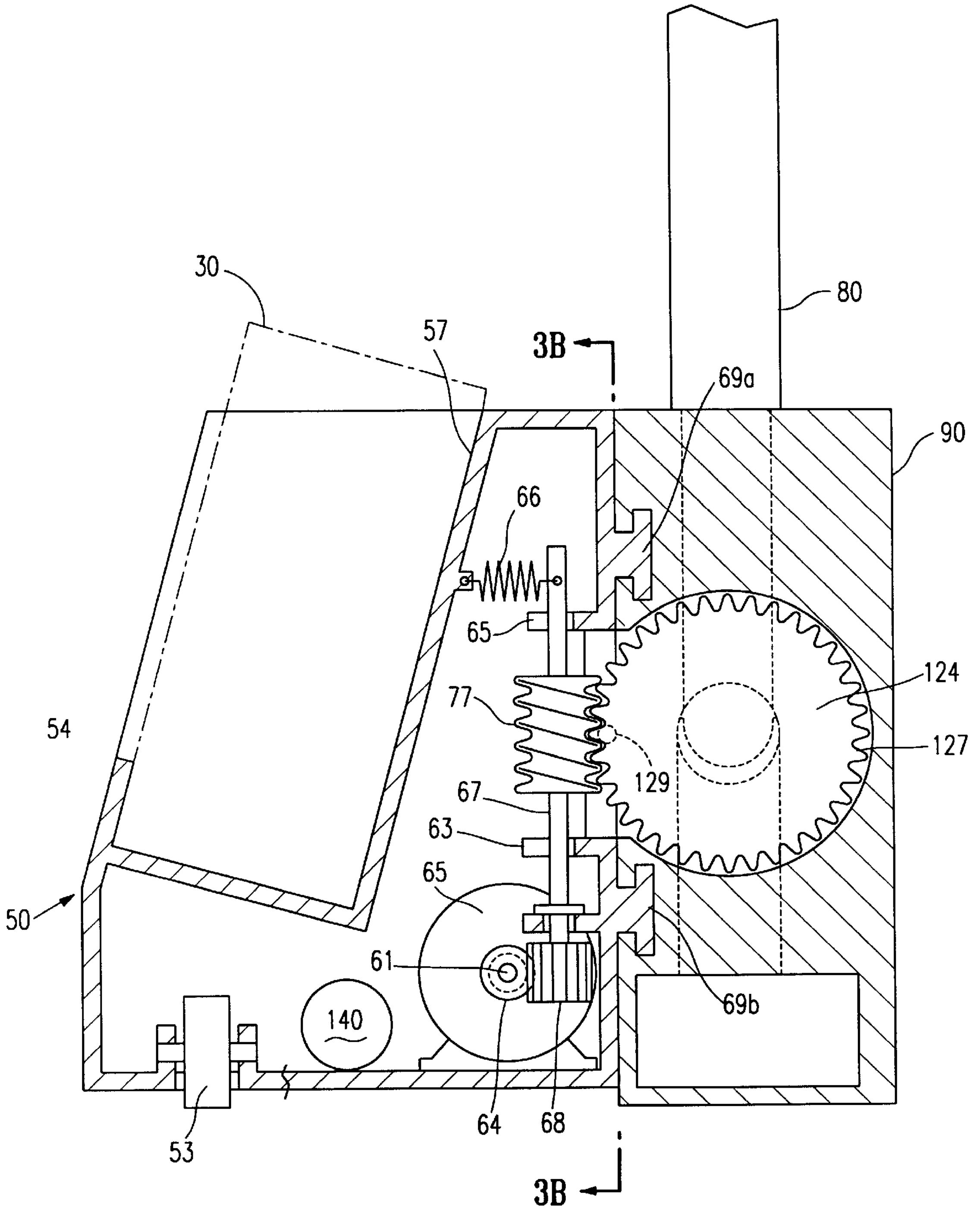
FIG. 3A is a view taken along the lines 3A—3A of FIG. 1A.

FIG. 3A is a side cut-away view of the carriage 50 coupled to the medication unit 70. The carriage 50 communicates with the two-way pager 30 and causes the mechanical rotation of the medication unit's delivery drum actuator 124. An upper surface 57 of the carriage 50 is angled downwardly to accommodate the pager 30. Lower flange 54 is curved to retain the pager 30. The pager 30 slides between a lower carriage flange 54 and rests upon the upper surface 57. A series of electrical contacts 61*b* (see FIG. 1B) are aligned along a side of the upper surface 57 of the carriage. The pager 30, as discussed below, contains a corresponding group of electrical contacts 61*a* for communication between the pager 30 and the carriage 50. Alternatively, the carriage 50 may include an infra-red transceiver, while the pager 50 may include an infra-red transceiver. If infra-red communication is used, the pager 30 need not be retained by the carriage 50.

The carriage 50 houses a battery 140, a motor assembly including electric motor 55 coupled to a first rotatable worm gear 64 by a first shaft 61. The electric motor is driven by the circuit shown in FIG. 4. The first worm gear 64 engages a second worm gear 68 having a direction of rotation at 90° from that of the first worm gear 64. The second worm gear 68 is coupled to a second shaft 67. The second shaft 67 passes between circular shaft retainers 63, 65 coupled to rear inner surface 57 of the carriage 50. The second shaft 67 is coupled to a rotatable carriage gear 77. A rectangular opening along the rear surface of the carriage 50 allows the carriage gear 77 to engage the drum actuator 124 when the carriage 50 engages the base medication dispenser 90. The fixed distance from all medication unit contacts 84*a,* 84*b* guarantees that when contact is made between carriage contacts 74*a,* 74*b* and medication unit contacts 84*a,* 84*b,* the carriage gear 77 will engage drum actuator 124. The spring 66 pushes the rotatable carriage gear 77 outward towards the medication unit 70 and provides flexibility to engage the serrations 127 of the dispensing drum actuator 124.

The carriage 50 includes two rails 69*a,* 69*b* disposed along a length of the rear surface of the carriage 50. The rails 69*a,* 69*b* slidably engage the grooves 73*a,* 73*b,* along the front surface of the medication unit 70. Once the carriage rails 69*a,* 69*b* engage the grooves 73*a,* 73*b,* the medication unit 70 may be adjusted such that the grooves of the carriage gear 77 contact the serrations 127 of the delivery drum actuator 124. Thus, the motor 55 indirectly causes rotation of the delivery drum actuator 124. Special notches may be formed on the rails 69*a,* 69*b* along with corresponding depressions in the grooves 73*a,* 73*b* of the medication unit 70 to provide an audible indication to the user that the medication unit and carriage are engaged. In addition, the notches and depressions serve to secure the relative position of the carriage 50 onto the medication unit 70.

Figure 4:
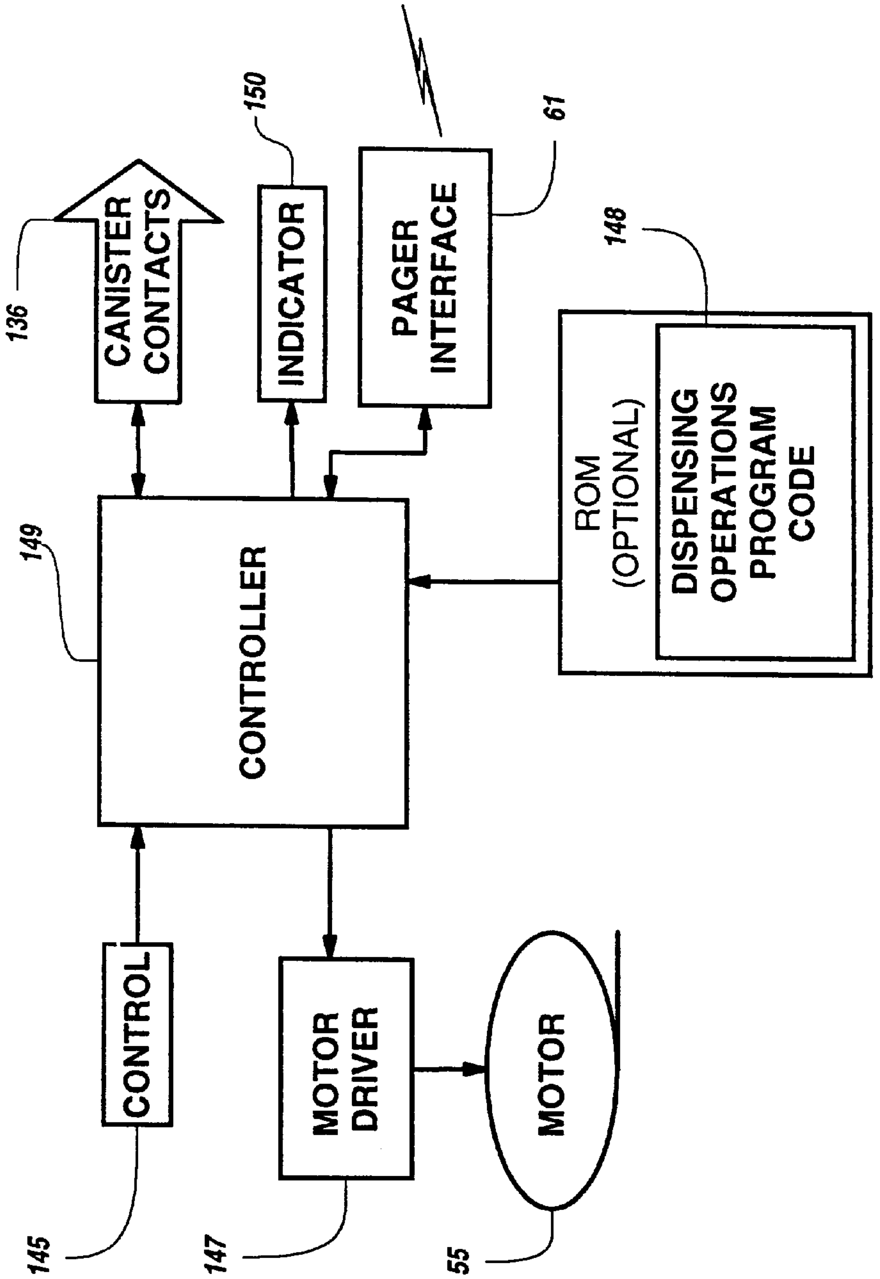
FIG. 4 is a block diagram of the carriage circuit.

FIG. 4 is a block diagram of the carriage circuit which powers the carriage motor 55. A power source, such as a battery 140, provides electrical power to a motor driver 147 and a dispenser control 149. The control may be an on/off switch 21 disposed on a front surface of the carriage (see FIG. 1A) creating an electrical path between the battery 140 and the other components in the circuit. The dispenser control 149 is a firmware controller that controls the dispensing operation of the carriage 50. In addition to firmware, the controller 149 may also be instructed by a read-only memory ("ROM") 148 containing code for communicating with the ID chip 88, LED indicator 22, the motor drive, and for controlling the dispensing operation.

The controller directs operation of a motor driver 147 and an indicator 22 disposed along the front surface of the carriage proximate the on/off switch 21. The indicator may be a light-emitting diode ("LED") that, for example, alternates between green and red states, where red indicates that power is being supplied to the controller 149 and green indicates a ready-to-dispense state. Other indicators are also possible. When the dispenser control 149 provides a control signal to the motor driver 147, the driver 147 initiates and ceases rotation of the motor 55. Rotation of the motor 55 indirectly rotates the delivery drum actuator 124 to dispense medication 100 from the canister 80 into the dispensing cavity 140.

The controller 149 communicates with the pager 30 via electrical bus contacts 61. Alternatively, the controller 149 and the pager 30 may communicate using infra-red or radio-frequency technology. A canister contact 136 allows the controller 149 to read the ID chip 88 embedded in the base 86 of the canister 80. As stated above, the ID chip 88 indicates the medication stored in the canister 80. The canister contact 136 may be a gold-coated spring leaf contact that electrically couples with the chip contacts 84*a,* 84*b*. The controller 149 may then decode the silicon chip 88 to determine the medication stored in the canister 80.

The information encoded into the canister ID chip 88 provides positive identification and confirmation of the proper medication. The contacts 74, 84 provide localization information prior to activation of the dispensing motor, thus ensuring that the canister is positioned correctly to engage the actuator 124. It should be apparent, however, that other means may be used to ensure such contact. For example, a magnetic strip on the canister 80 and a magnetic reader on the carriage 50 may be utilized. Similarly, a bar code disposed on the canister 80 and an optical reader on the carriage 50 may be used to store information about the specific medication and provide localization information.

Figure 5:
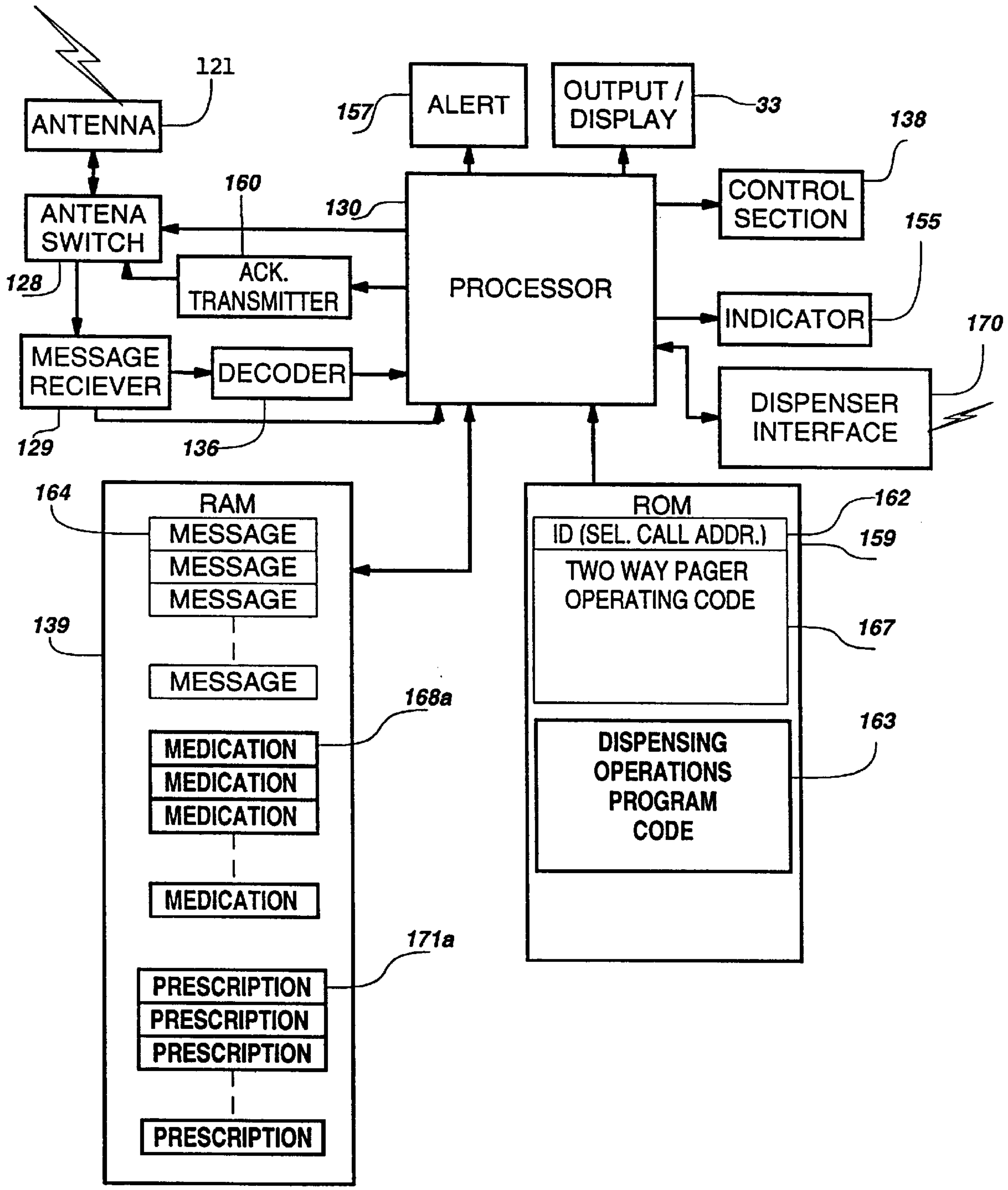
FIG. 5 is a block diagram of the pager circuit.

FIG. 5 is a block diagram of the circuitry for the acknowledge-back pager 30. Acknowledge-back paging circuits are well-known and described in U.S. Pat. No. 5,563,382, to Nikas, issued Oct. 31, 1995, which is incorporated by reference herein. The pager 30 is a portable acknowledge-back pager, such as the pager sold under the trademark Tango by Motorola Corp., although other acknowledge-back pagers may be used. The pager 30 includes an antenna 120 for accepting messages transmitted from a remote message transmitter as radio signals. The antenna 120 is coupled to an antenna switch 121 for steering the signals to and from the antenna. The antenna switch 128 is controlled by a processor 130. The switch is further coupled to a message receiver 129 for demodulating the radio signals sent from the antenna switch 128. The message receiver 129 is coupled to a decoder 136 and the processor 130 for decoding and processing information carried in the radio signals. The processor 130 is coupled to a memory 139, such as a random access memory ("RAM"), for storing messages in memory locations. The RAM 139 stores a plurality of messages, including standard paging messages 164 medication messages 168*a* and prescription messages 171*a*. As discussed in greater detail below, each medication message contains a serial ID number for a canister containing a prescribed drug and a pointer or reference to a unique prescription message for that medication. The canister ID number stored in RAM corresponds to the encoded data in the canister ID chip 88 embedded in the lower surface of the canister 80. The prescription message, as described in greater detail below, contains specific medication dispensing information, such as a timing regimen (e.g., three times a day), indications, contraindications, and other information or instructions associated with the medication. The processor 130 is also coupled to an output element 33, such as a display for alphanumeric messages and/or a loudspeaker for synthesizing voice output.

The processor 130 is further coupled to a control section 138, comprising well-known switches and buttons, such as a touch pad and navigation buttons disposed adjacent the display. The touch pad includes four pads surrounding a central touch key. The four pads and the central touch key allow the user to select alphanumeric entries listed in the display. For instance, each pad may correspond to the desired direction (up, down, left, and right) of a cursor within the display. Once an entry has been highlighted or otherwise indicated, the central touch key may be used to select that entry. It should be apparent, however, that another user interface may be employed. For instance, an alphanumeric keypad may be used to enter text directly into the display. The processor is coupled to an alert element 157, such as a conventional piezoelectric transducer ("PZT") for generating an audible or visible alert in response to receiving information intended for the pager 30. An indicator 155, such as an LED or liquid crystal display ("LCD"), is also coupled to the processor 130 for providing a visible indication to the user that there is a message on the pager display. It will be appreciated that the indicator 155 can be integrated with either the output element 33 or the alert element 157, or both, as well.

The processor 130 is also coupled to an acknowledge transmitter 160 for controlling the generation of acknowledge messages therefrom. The acknowledge transmitter 160 is coupled to the antenna switch 128 for steering the acknowledge messages to the antenna 120 for transmission to a paging service or other infrastructure. The processor 130 is coupled to a read-only memory ("ROM") 159 comprising firmware elements including a selective call address 162 for uniquely identifying the pager 30. The firmware elements preferably also include two-way pager operation code 167 which controls pager operation and dispensing operations program code 163. The code for pager information controls several pager functions, including medication message processing in RAM memory, monitoring the next action and displaying information for the patient, dispensing control, and enabling read and/or write into the ID chip 88. These operations can be implemented using a standard one-way pager. The code that composes the compliance messages for pre-scheduled transmission is applicable to a two-way pager. Message reception and confirmation are handled routinely by a two-way pager with the addition of multiple choice answer selection for reply to alphanumeric messages and storage of pre-prepared queries.

The pager circuit further includes a dispenser interface 170 for communication between the pager and the carriage. The interface 170 may be electrical contacts 61*b* (see FIG. 1B) electrically coupled to the carriage contacts 61*a*. Alternatively, the interface 170 may be an RS-232 interface, an infra-red link, or a radio-frequency link. The interface 170 is coupled to the processor 130.

The two-way pager 30 is part of a communication infrastructure that permits two-way communication among physicians, pharmacists, health care organizations, paging services, and subscribers (patients). Depending upon the type of paging service, the message received from the paging service may be either a numeric message, an alphanumeric message, or a voice message. A message is sent to a subscriber via the paging service access number (usually a toll-free telephone number). Alternatively, a message may be sent via another communication network that couples into the RF paging network(s), such as the Internet. The paging service then transmits the message throughout the service area using base stations which broadcast the paging message on a radio carrier. The subscriber may respond to the message using the touch pad 35.

FIGS. 6–12 illustrate the global flow of messages in a network containing at least one patient using the medication dispenser of the present invention, at least one database storing patient medication information, and at least physician or pharmacist. Preferably, the database is a computer system administered by a health care company or the physician or pharmacist, or a vendor of the dispenser. Messages may be sent back and forth through this network using a standard two-way paging network. Messages may also be sent and received using a telephone, cable, or wireless network. In addition, internet or intranet messaging networks are possible for messages sent by paging networks connected to the internet.

As described herein, the database is a depository of patient medication data, prescription, supplied medication units, and compliance information. The database may reside in the physician computer, within a health care organization, within a medication unit manufacturer, or within a drug distribution organization. Numerous databases may exist and communicate with different clients. Only one central database, however, is necessary to identify a patient relative to a particular internal database. This central database may be placed within the paging network computers that act as a traffic coordinator for all messages.

FIGS. 6A–6E show exemplary message structures for messages transmitted within the network. A "New Medication Unit→DB" message 168*b* is transmitted by a physician or pharmacist to the database to inform the database that a new medication unit has been provided to the patient. For example, the physician may provide the patient with an office sample of a medication unit. To inform the database of this provision and, thereby, "activate" the medication unit, the physician must transmit the "New Medication Unit→DB" message 168*b*. The database will then forward the message to the patient and the serial ID and medication ID will be stored in RAM 139 of the pager 30 as medication 168*a*. The message 168*b* includes a serial ID number 165 indicating the specific canister given to the patient. A medication ID number 169 is used to specify the medication contained in the medication unit. Each patient is assigned a unique patient ID number 172 that is included in the message 165 that is sent by a prescribing physician/pharmacist. All messages conclude with an end-of-message signal 173 that may include an error detection code. The error code is designed to ensure the integrity of a message, including all of the required message components.

Figure 6A:
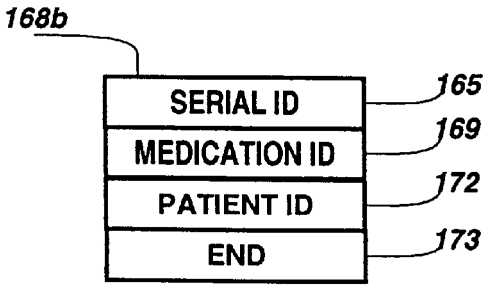
FIG. 6A is a diagram of a medication unit message transmitted to a central database.
Figure 6B:
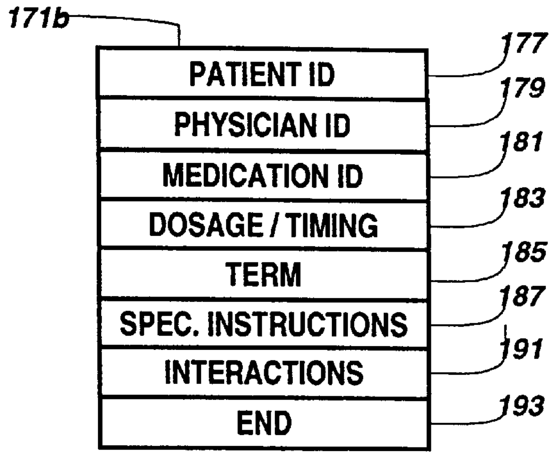
FIG. 6B is a diagram of a prescription message transmitted to a central database from a drug supplier.

When the physician provides the patient with a new prescription, the physician transmits a "New Prescription→DB" message 171*b* to the database. The database will forward the message 171*b* to the patient and the information, excluding the patient ID and END components, will be stored in the RAM 139 of the pager 30 as a prescription 171*a*. The "New Prescription→DB" message is illustrated in FIG. 6B. The message includes the patient ID number 177, a physician ID number 179 that uniquely specifies the prescribing physician, and the medication ID number 181. The message 171 further includes a dosage/timing component 183 and the term 185 of the prescription. Special instructions 187 may follow the term 185 component. An optional interaction component 191 may specify contraindications and foods that may not be taken with the medication. The message concludes with an end-of-message signal 193 that may include an error detection code.

Figure 6C:
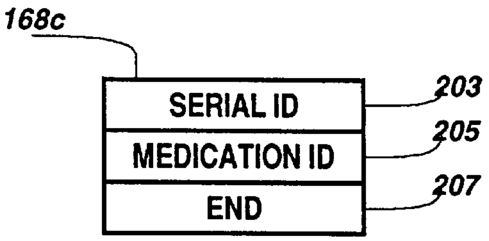
FIG. 6C is a diagram of a medication unit message transmitted to a patient from a physician.
Figure 6D:
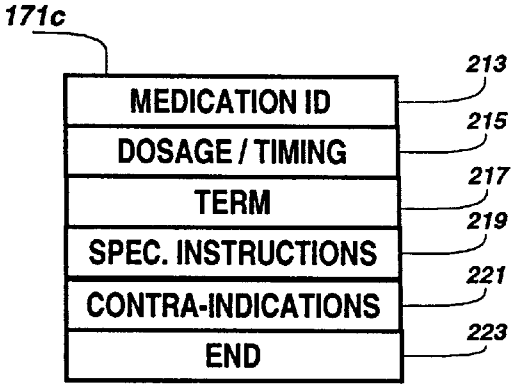
FIG. 6D is a diagram of a prescription message transmitted to a patient.
Figure 6E:
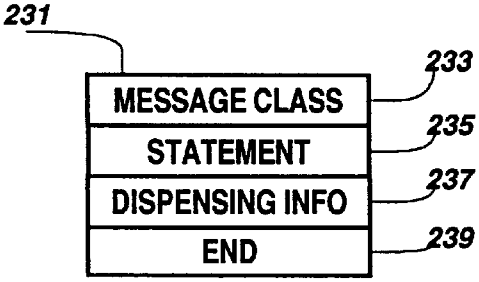
FIG. 6E is a diagram of a response or report message transmitted by a patient to a central database.

To activate a new medication unit and permit dispensing by the dispenser, the database system transmits a "New Medication Unit→P" message 168*c* to the patient after receiving the "New Medication Unit→DB" message 168*a* from the pharmacist/physician. The "New Medication Unit→P" message 168*c* is illustrated in FIG. 6C. The "New Medication Unit→P" message 168*c* includes the serial ID number 203 and medication ID number 205. The database specifies a new prescription by transmitting a "New Prescription→P" message 171*c* containing the medication ID number 213, the dosage/timing component 215, the term 217, the optional special instructions 219, and optional contraindications 221. The database uses the patient ID 172, 177 to create a message specific to the patient. The messages 178*c*, 171*c* are similar to messages 168*b*, 171*b*, excluding the patient ID. Thus, only the target patient will receive the message.

The patient may also send messages to the physician through the database. A patient message, "Patient→DB" 231, begins with a message class identifier 233. The message class indicates the type of message being transmitted by the patient. Certain pre-defined message classes may exist. For instance, sample message classes include a daily report class automatically downloaded from the patient during low-network traffic time (e.g., overnight), a patient-initiated emergency class, a patient-initiated query class, an unrecognized medication unit class, and a regular two-way message class for regular pager operation. The message class is followed by a statement 235 component from the patient. The statement 235 may be an alphanumeric message generated by the patient or chosen from a menu of predefined messages. The message 231 further includes the dispensing information 237 provided by the patient. The dispensing information indicates the medication ID, the dosage taken, and the time the dosage was administered. Dispensing information for each medication (in the case of multiple medication units) may be included.

Figures 7, 7A:
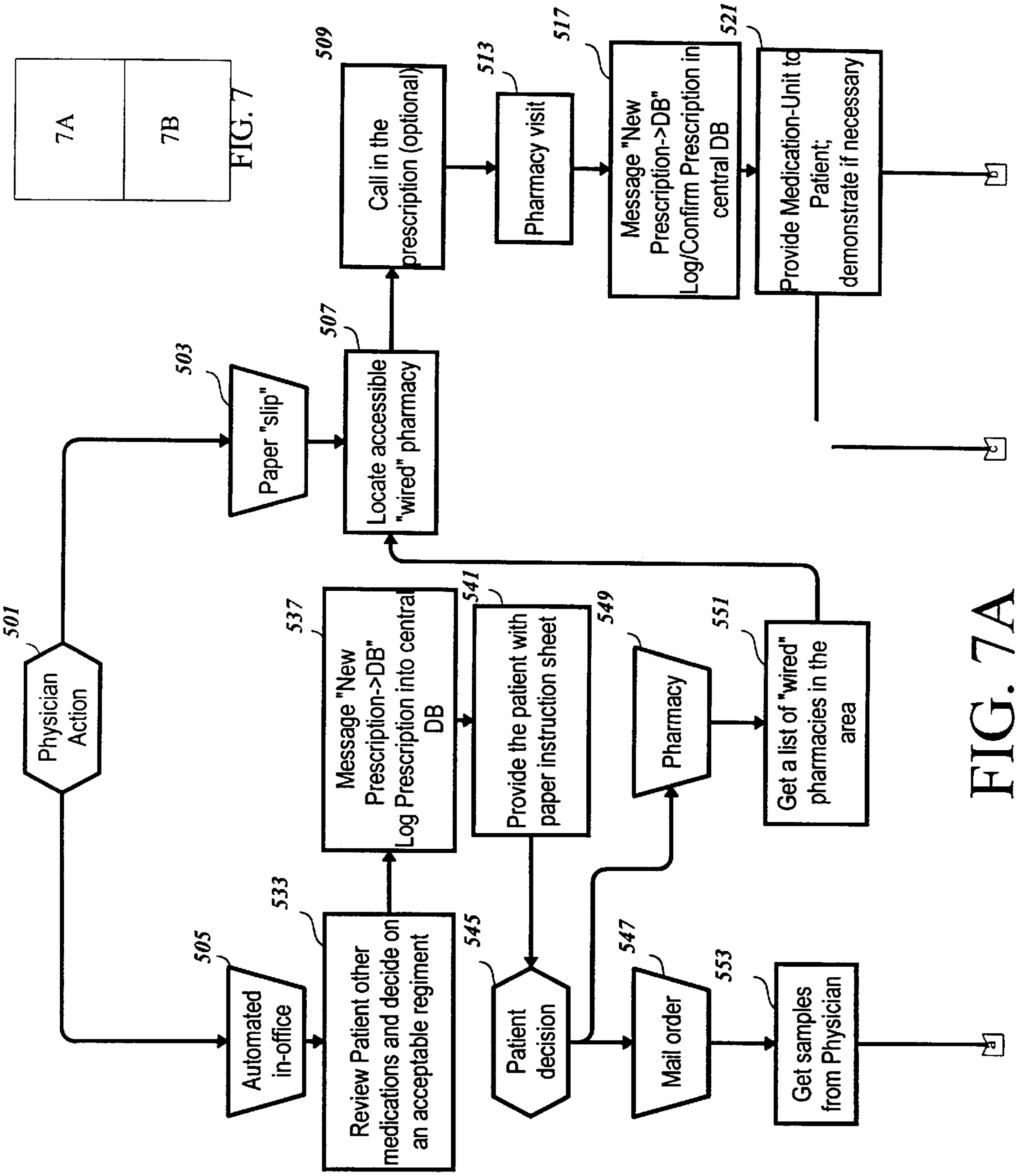
FIGS. 7A and 7B are flow chart illustrating the transmission of prescriptions to patients.
Figures 7, 7B:
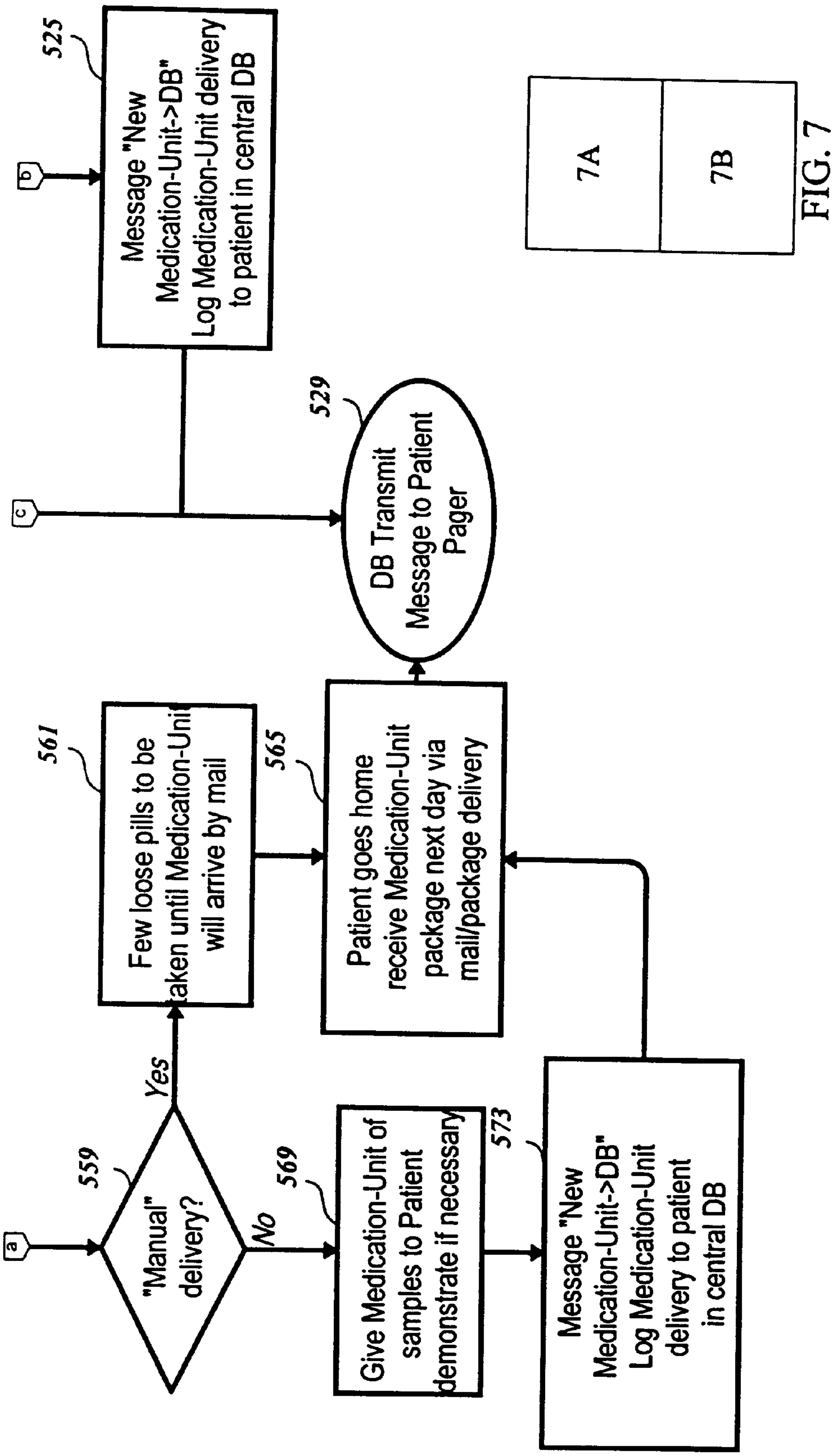

FIG. 7 is a flow chart illustrating the global flow of prescription data from a prescribing physician or pharmacist to a database. In step 501, the physician may prescribe medication in at least two ways. She may prepare a conventional paper slip prescription in step 503 or she may use an automated in-office method for preparing prescriptions in step 505. If a paper prescription is prepared, the patient must locate an accessible "wired" pharmacy in step 507. A wired pharmacy is a pharmacy with access to the network containing patient and medication information. The wired pharmacy is also capable of dispensing a medication unit to the patient. The patient may optionally phone the pharmacy with the prescription in step 509. In step 513, the patient visits the wired pharmacy to fill the prescription. The pharmacist, in step 517, sends the "New Prescription→DB" message 171*b* to the database. This prescription is confirmed by the database and forwarded to the patient as a "New Prescription→P" message 171*c*, as described below. The pharmacist fills the prescription by providing a medication unit to the patient in step 521. The pharmacist may demonstrate the unit if necessary. The pharmacist, in step 525, then sends a "New Medication Unit→DB" message 168*b* to the database to indicate that the medication unit has been provided. The database, as discussed in greater detail below, confirms the information contained in the message and forwards a "New Medication Unit→P" message 168*c*. The database, in step 529, transmits the appropriate message to the patient's pager. The patient may then operate the dispenser and receive medication from the medication unit.

Alternatively, the physician may use an automated in-office system for processing prescriptions. In step 533, the physician reviews the patient's current prescriptions and decides on an acceptable medication regimen. Next, in step 537, the physician transmits the "New Prescription→DB" message 171*b* to the database. The downloaded prescription is stored in the database and forwarded to the patient as a "New Prescription→P" message 171*c*. The physician provides the patient with an instruction sheet describing the operation of the dispensing system. In step 545, the patient decides whether or not to use a wired pharmacy or mail in the order. If the pharmacy is chosen in step 549, the physician provides the patient with a list of wired pharmacies in the area. The patient may then proceed to step 507 and locate a wired pharmacy. If the patient decides to mail in the order, he may receive sample medication units from the physician in step 553. In step 559, the patient may choose between manual delivery of the sample medication or automated dispensing of the sample medication. If manual delivery is chosen, the physician, in step 561, may provide the patient with loose pills or tablets. The patient may use these pills until his medication unit arrives by mail.

In step 565, the patient awaits receipt of a medication unit by mail. If automated dispensing of sample pills is chosen, the physician may provide a sample medication unit to the patient for demonstrative purposes in step 569. The physician then sends the "New Medication Unit→DB" message 168*b* to the central database. The database will forward the message to the patient as a "New Medication Unit→P" message 168*c*. A mail fulfillment center for the medication logs the medication unit transmitted to the patient, similar to the step performed by the pharmacist in step 525.

Figures 8, 8A:
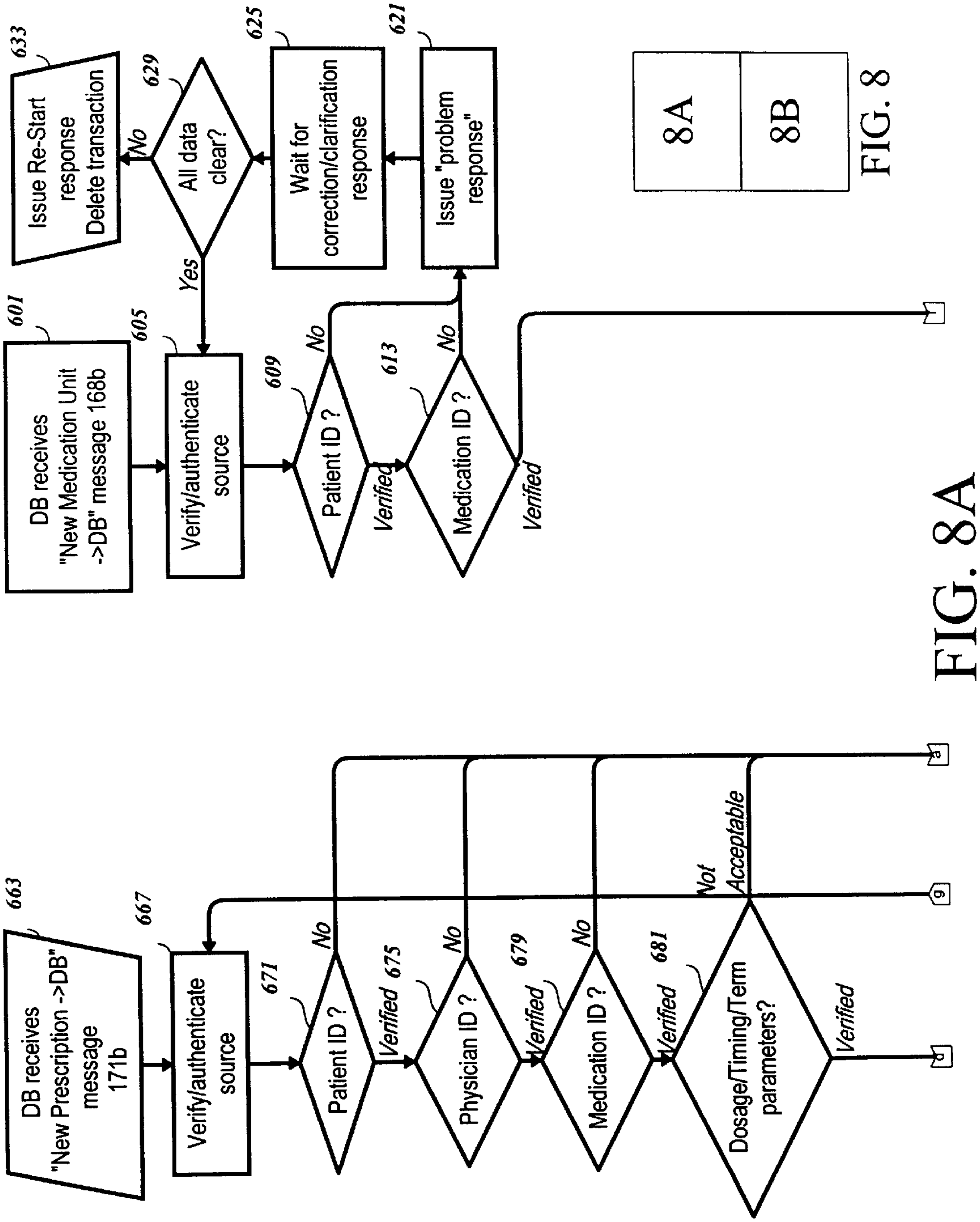
FIGS. 8A and 8B are flow chart illustrating the flow of information from a database to patients.
Figure 8B:
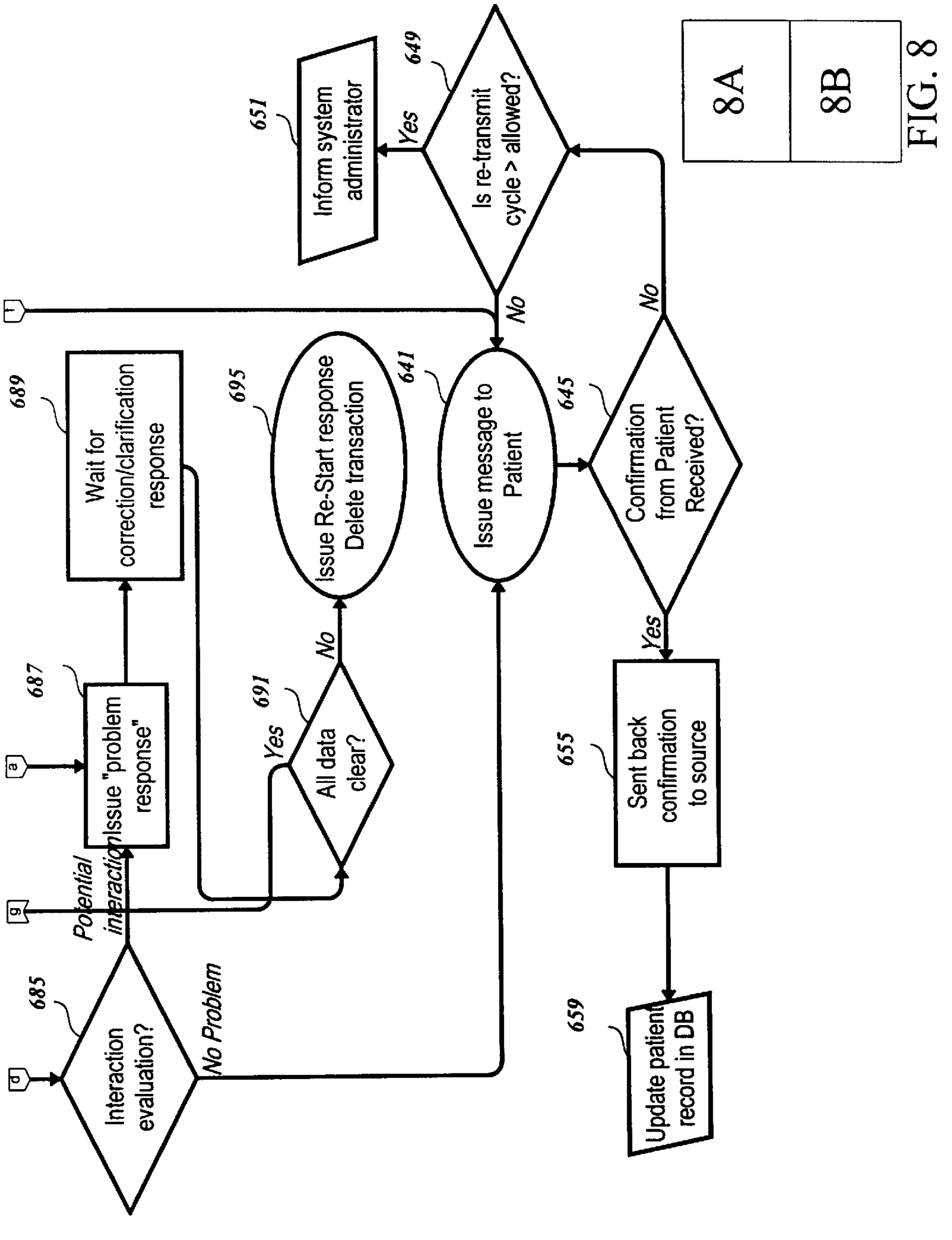

FIG. 8 is a flow chart illustrating the flow of data from a database to a pager 30, upon receipt of a "New Medication Unit→DB" message 168*b* or a "New Prescription→DB" message 171*b* from the physician/pharmacist or drug supplier. As stated above, the physician may transmit a "New Medication Unit→DB" message 168*b* to specify that a new medication unit has been provided, and a "New Prescription→DB" message 171*b* to indicate that a new prescription has been given to the patient. Upon receiving the "New Medication Unit→DB" message from the provider in step 601, the database, in step 605, verifies or authenticates the source of the message. In steps 609–613, the database verifies that the patient ID and the medication ID are stored in the system. If either of the message components cannot be verified, the database, in step 621, issues a "problem response" message. In step 625, the database waits for a response correcting or clarifying the transmitted message. In step 629, the system determines whether or not the data has been resent. If the data has been resent, the database returns to step 605. If the data has not been resent, the database issues a "Restart" message to the physician/pharmacist and deletes the current transaction in step 633.

If the patient ID and medication ID are verified by the system, the database issues the proper messages, "New Prescription→P" message 171*c* or a "New Medication Unit" message 168*c* in step 641. In step 645, the database awaits a confirmation from the patient indicating that the message has been received. If no confirmation is received, the database, in step 649, determines whether the message may be re-transmitted. A fixed number of re-transmission tries may be specified by the database administrator. If re-transmission exceeds the number allowed, the database notifies the administrator in step 651. If re-transmission of the message is permitted, the system returns to step 641. When the patient confirms receipt of the message, the confirmation is transmitted to the database in step 655. In step 659, the database updates the patient's medical record.

Upon receiving a "New Prescription→DB" message 171*b* in step 663, the database verifies or authenticates the source in step 667. In steps 671–685, the database verifies the patient ID, physician ID, medication ID, dosage/timing/term parameters, and interaction evaluation. If any of these message components cannot be verified, the database issues, in step 687, issues a "problem response" message. In step 689, the database waits for a response correcting or clarifying the transmitted message. In step 691, the system determines whether or not the data has been resent. If the data has been resent, the database returns to step 667. If the data has not been resent, the database issues a "Restart" message to the physician and deletes the current transaction in step 695. Once each message component has been confirmed, the database continues in step 641 by issuing the proper message, "New Prescription→P" message 171*c* in this case.

Figures 9, 9A:
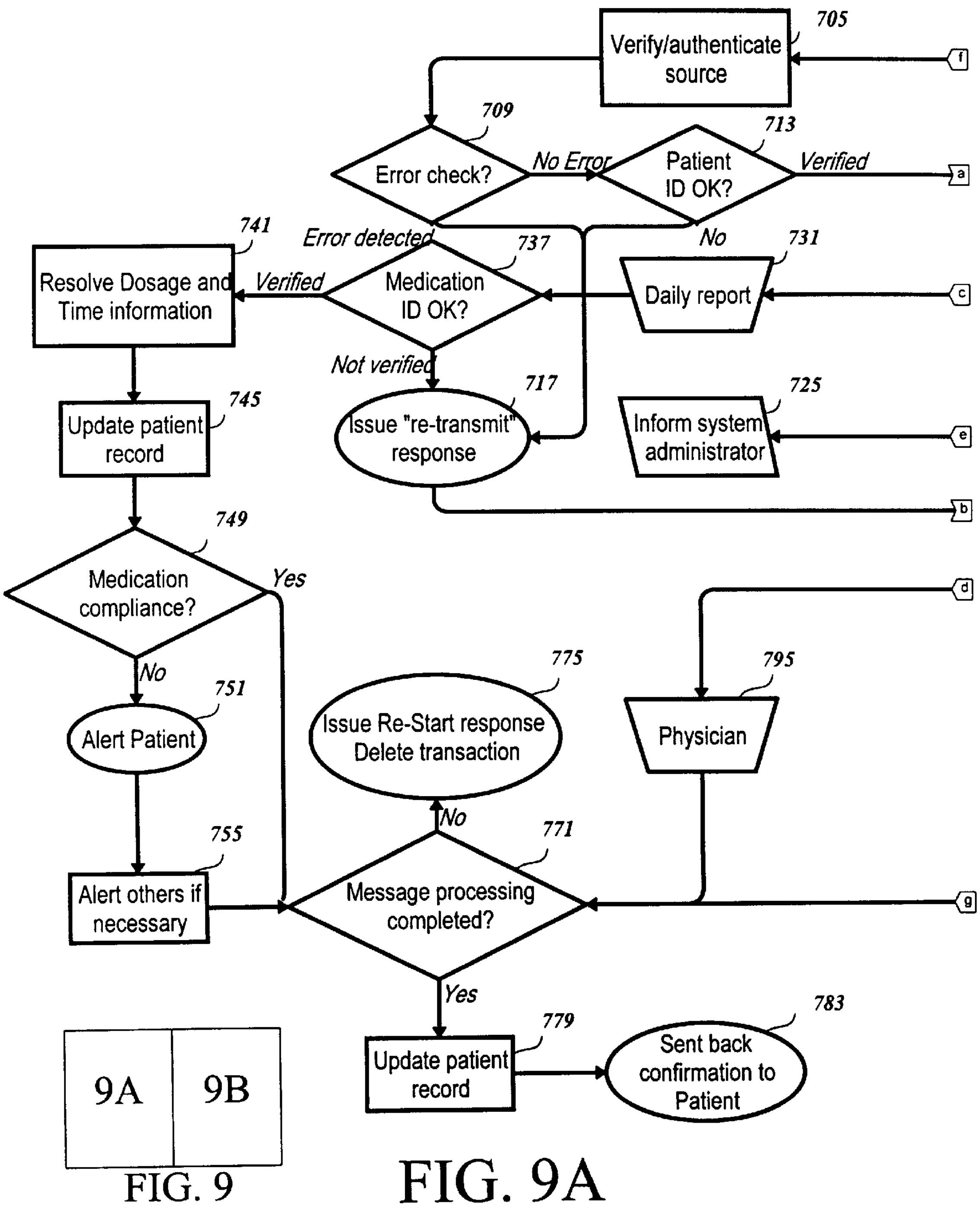
FIGS. 9A and 9B are flow chart illustrating the flow of information from a patient to a database.
Figure 9B:
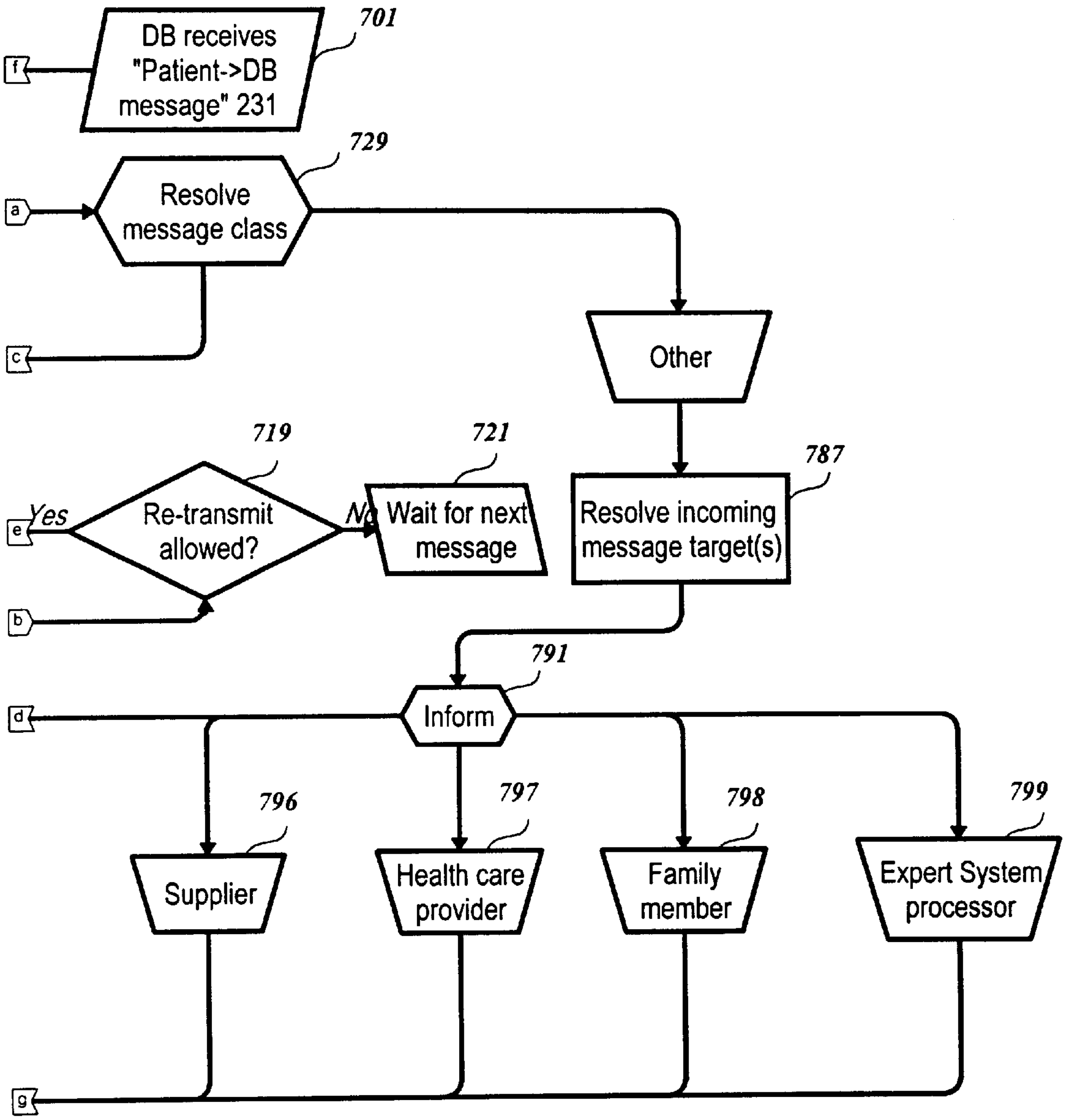
Figure 9:
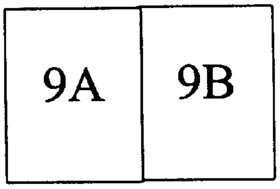

FIG. 9 illustrates the flow of data from the patient back to the database. Upon receipt of the "Patient→DB" message in step 701, the database verifies or authenticates the source. In step 709, the database performs an error check to verify the integrity of the message. If no error is found, the database then tries to match the patient ID with a stored ID in step 713. If an error is found or if the patient cannot be verified, the database issues a "Retransmit" message back to the patient in step 717. The database then determines whether the number of re-transmission attempts has exceed the allowable limit under the system administrator's rules. In step 721, the database waits for the next message. If re-transmission is not permitted, the database informs the system administrator of the problem in step 725. Once the patient ID has been verified, however, the database then attempts to resolve the message class component of the message in step 729.

When the message is a daily report message, the database verifies the medication IDs in step 737. If the medication IDs or one of the medication IDs cannot be verified, the database goes to step 717 and issues a "Retransmit" message. Once the medication ID is verified, the dosage/time component of the message is resolved in step 741. In step 745, the patient's medical record is updated. In step 749, the database then determines whether or not the patient has properly complied with the medical regimen stored in the patient's record. The database alerts the patient if he fails to comply with the regimen. In step 755, the database alerts others, such as the physician or other medical personnel. The database system, in step 771, determines whether the message has been processed completely. If the message has not been processed completely, the system re-initiates the response and deletes the current transaction in step 775. If the message has been processed completely, the database updates the patient's record in step 779 and sends a confirmation back to the patient in step 783.

When the received message is not a daily report, the system attempts to resolve the target of the incoming message. In step 791, the database informs the appropriate target. FIG. 9 lists sample targets, including a physician 795, a medication supplier 796, a health care provider 797, a family member 798, and an expert system processor 799. It should be understood, however, that other persons or organizations may be included. Once the message has been passed on, the database proceeds to step 771.

Figures 10, 10A:
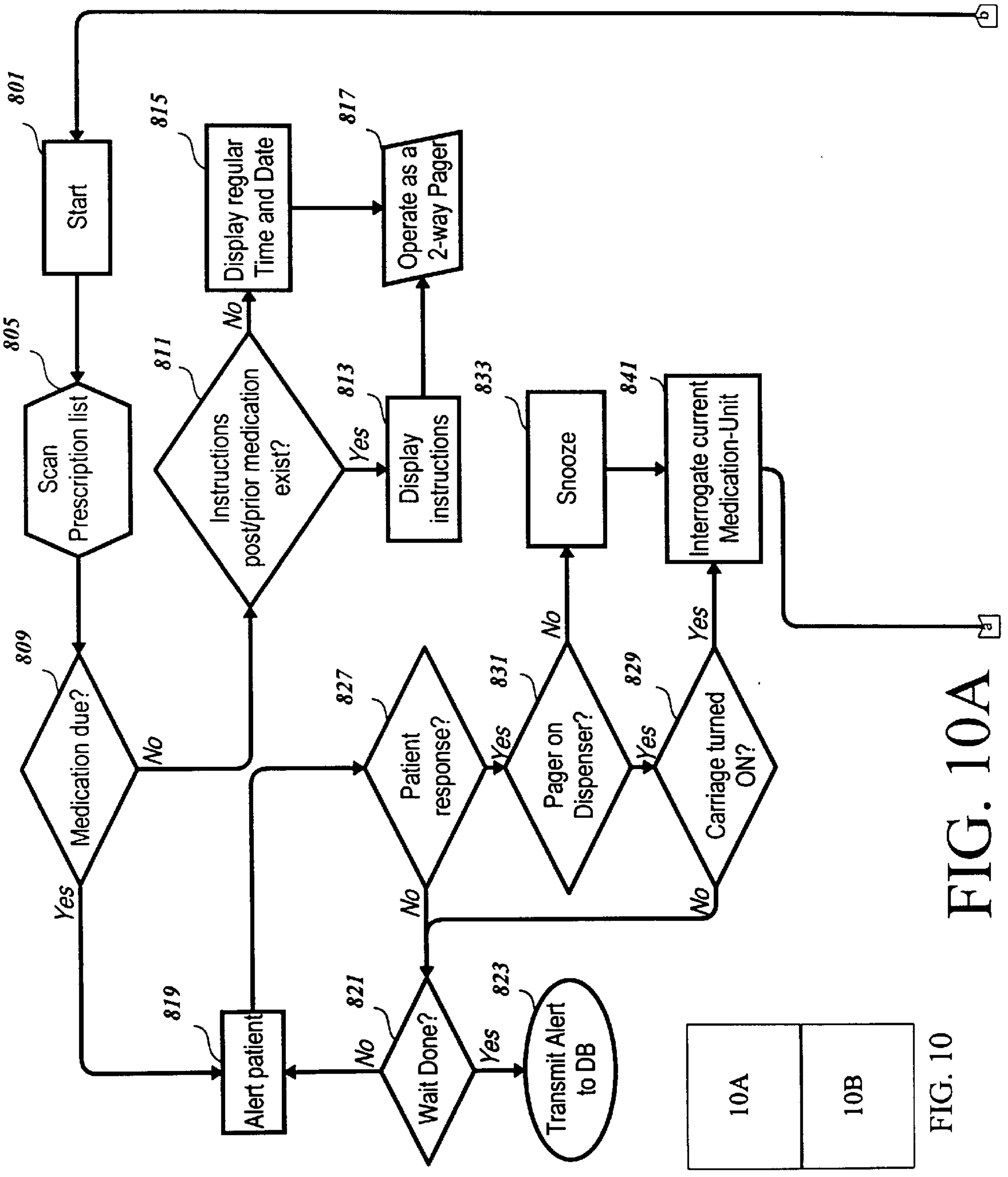
FIG. 10 is flow chart illustrating the operation of the pager, carriage, and medication unit.
Figures 10, 10B:
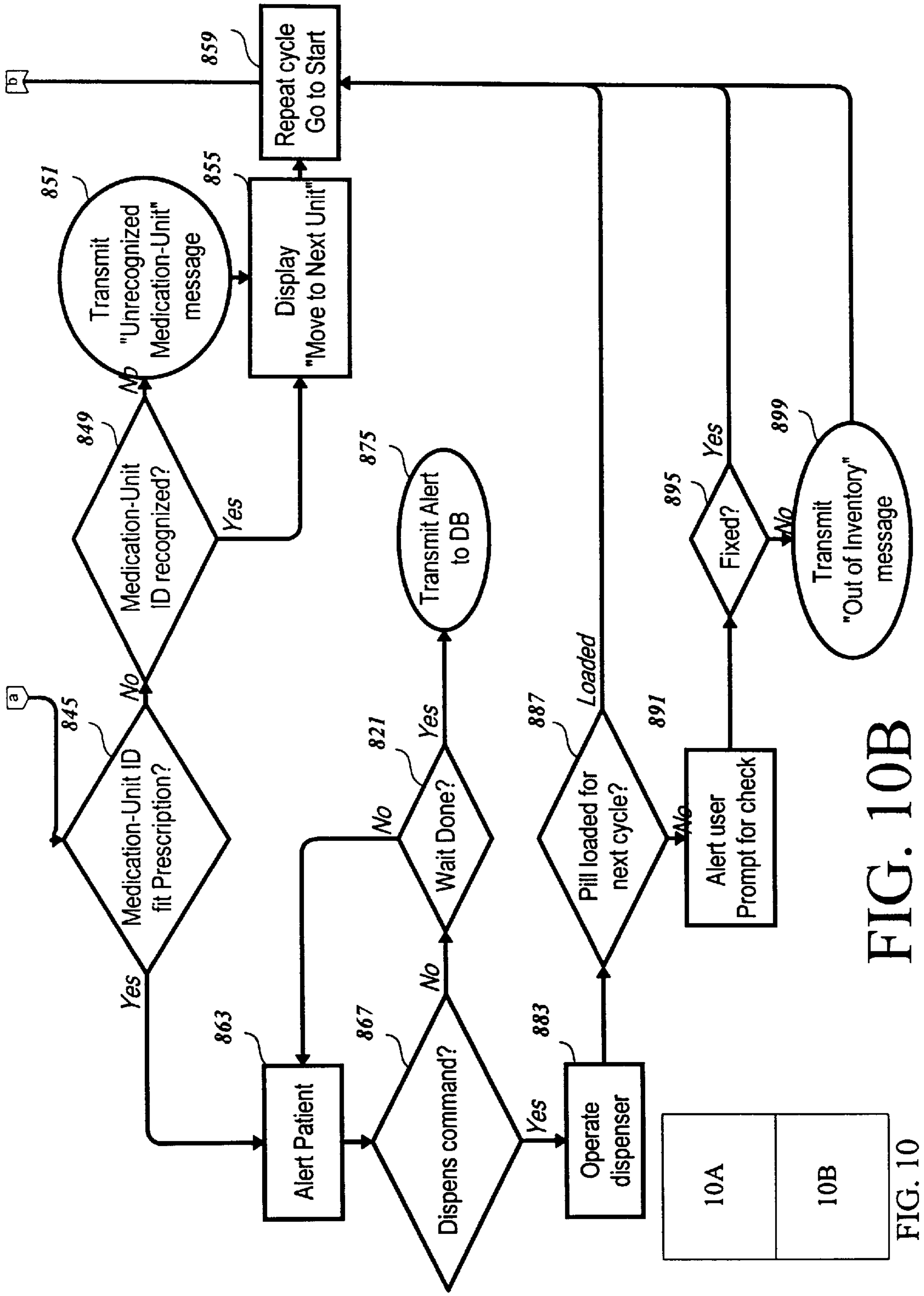
Figure 11:
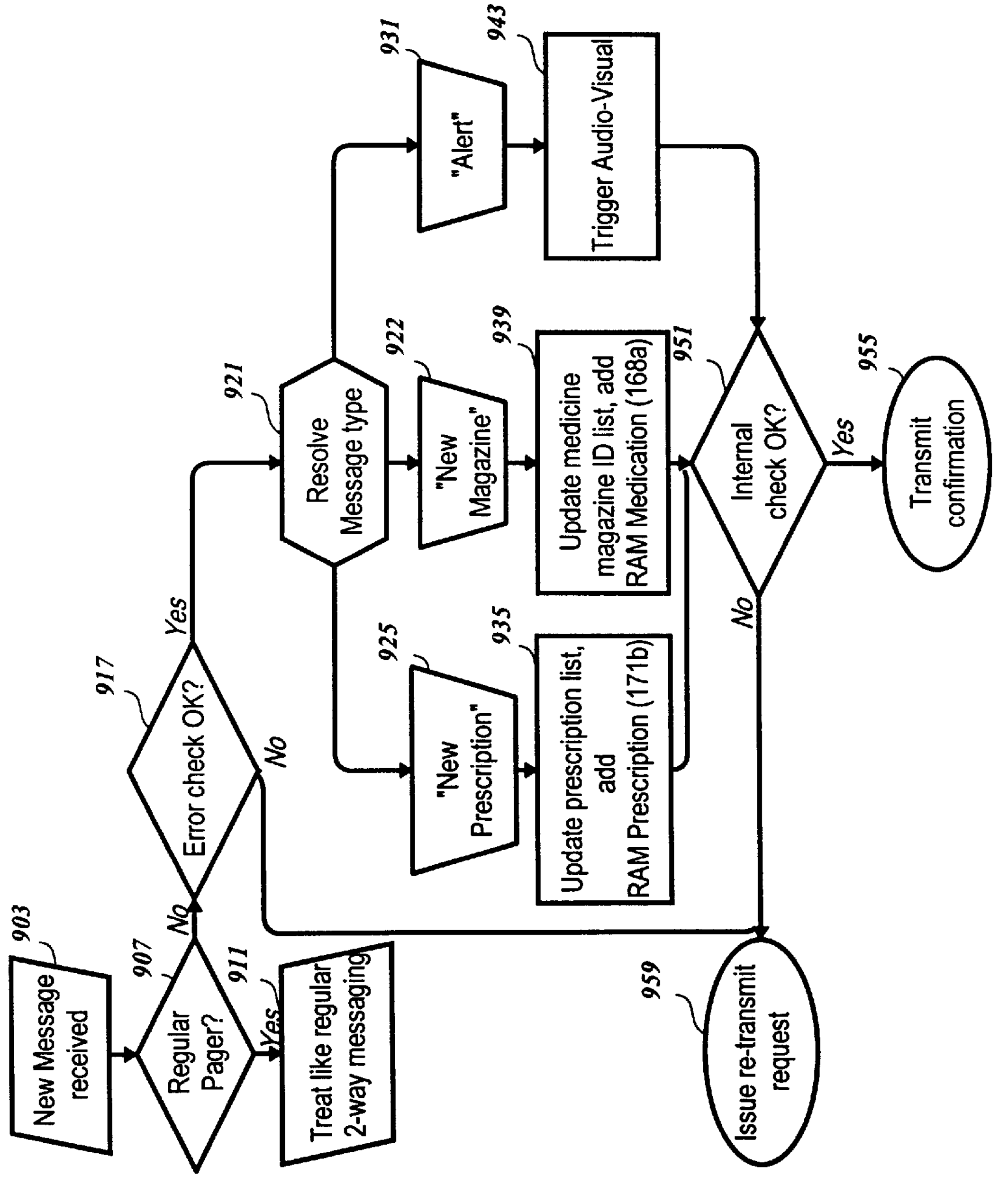
FIG. 11 is a flow chart illustrating the receipt of a message by the pager.
Figure 12:
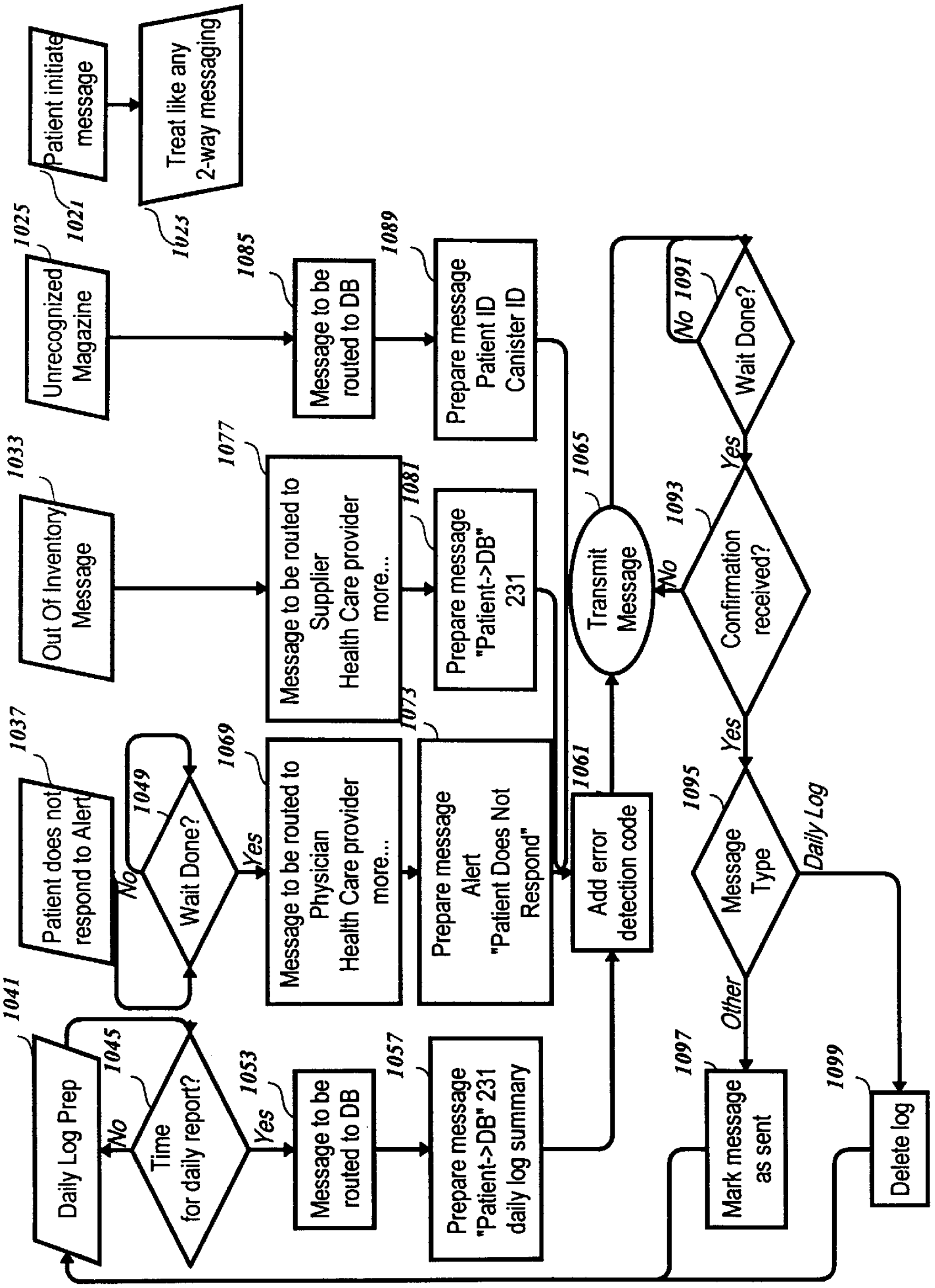
FIG. 12 is a flow chart illustrating the transmission of a message by the pager.

FIGS. 10–12 illustrate the operation of the device and the local processing of messages. As discussed above, paging and dispensing operations 163 may be stored in the pager ROM 159 or by the controller 149 of the carriage 50. FIG. 10 illustrates the pager-dispenser operation. At start-up, operation of the pager 30 begins with a start signal in step 801. At this step, temporary memory buffers are cleared and registers are re-set. At step 805, the processor scans the list of prescriptions 171*a* stored in pager RAM 139. The processor, in step 809, decides whether or not medication is due based on the accessed prescription list. If no medication is due at this time, the processor searches for instructions regarding pre/post medication consumption (e.g., a warning not to eat within two hours prior to taking a particular medication). If none exist, the processor displays the normal time and date in step 809 and operates the pager as a normal two-way pager. If instructions are available, the instructions are displayed in step 813, indicator 155 may be activated, and the pager functions as a two-way pager.

When medication must be administered, the patient is alerted in step 819 via an audible beep through loudspeaker 157 and the display of an alphanumeric message. The patient must respond to the device to confirm receipt of the alert message. When no response is received, the pager waits a predetermined amount of time (e.g., 45 minutes) before transmitting an alert message to the database in step 823. Once the patient responds, the processor attempts to establish communication with the carriage in step 831. If no communication can be established with the carriage, the pager enters a snooze mode for a predetermined amount of time in step 833. If communication is established, the pager 30 determines whether or not it is placed on the carriage 50. If the pager 30 has not been placed on the carriage 50, the pager 30 enters a snooze mode at step 833, waits a fixed amount of time, and checks again in step 829. Once the pager 30 recognizes that it is sitting on the carriage 50, the processor then interrogates the medication unit by reading the serial ID number of the medication unit in stop 841. In step 845, the processor compares the medication unit ID number with the medication ID number specified in the current prescription. If the two numbers do not match, the processor, in step 849, compares the medication unit ID number with a stored local list of medication ID numbers. The processor issues an "Unrecognized Medication Unit" message when the ID numbers do not match in step 851. If the medication is among the approved medications on the list, the processor displays the message "Move to Next Medication Unit" (in the case of multiple medication units) and returns to step 801.

When the medication unit ID number and the current prescribed medication ID number match, the pager alerts the patient through an audible beep and an alphanumeric message in step 863. The processor, in step 867, determines the current dispensing state of the medication unit. If no dispense command or control signal has been issued, the processor waits a predetermined amount of time before transmitting an alert message back to the database in step 875. Once the dispense command or control signal has been issued, the carriage motor moves one full turn to dispense the medication from the delivery drum into the dispensing cavity in step 883. Optionally, after dispensing, the processor, in step 887, may verify that the next pill or tablet is loaded in the delivery drum for the next pill cycle. This method is described in greater detail below. Once the pill has been loaded and confirmed, processing resumes at step 801. If the pill fails to load, the user is alerted through an audible beep and an alphanumeric message in step 891. Once the patient manually loads the pill or resolves the problem by shaking the unit, processing resumes at step 801. Where the delivery drum problem cannot be fixed, the pager transmits an "Out of Inventory" message to the database in step 899, and returns to step 801.

FIG. 11 is a flowchart illustrating the receipt of a message by the pager 30. In step 903, the pager processor receives an incoming message. If the message is a standard pager message, the pager functions as a two-way pager in step 911. If the message is not a pager message, the processor performs an error check on the message. Should the message fail the error check, the processor issues a "Retransmit" request to the sender. Once the message has passed the error check, the processor attempts to resolve the message type in step 921. For "New Prescription" messages 171*b*, the processor updates the list of prescriptions 171*a* stored in RAM 139 by adding a new prescription 171*a* in step 935. A "New Medication Unit" message 168*b* is processed by updating the list of medications 168*a* to include the new medication unit in step 939. "Alert" messages are processed by displaying the message and producing an audible beep. Once the message has been processed, an internal check is made in step 951. If the internal check fails, the pager requests the re-transmission of the message in step 959. If the internal check passes, the pager transmits a confirmation back to the sender in step 955.

FIG. 12 is a flowchart illustrating the transmission of a message by the pager 30. Patient-initiated messages 1021 are treated like standard two-way messages. For daily report preparation, a daily report message is held until a daily report becomes due. In step 1057, the "Patient→DB" message containing the daily report is prepared. The processor adds an error detection code in step 1061 and then transmits the message in step 1065. The processor waits a predetermined amount of time in step 1091 before expecting confirmation of the message in step 1093. If no confirmation is received, the message is retransmitted. Once confirmation has been received, the message is resolved. If the confirmation is a daily log message, the log stored in RAM is deleted in step 1099. Otherwise, the message is marked as sent in step 1097.

When the carriage fails to recognize a medication unit, the message is routed to the database. The patient ID and canister ID are transmitted in step 1089. When the canister runs out of medication, a "Patient→DB" message is routed to the supplier or physician in step 1081.

Finally, the processor transmits a message when the patient fails to respond to an "Alert" message. After waiting for a predetermined period in step 1049, a "Patient Does Not Respond" message is prepared and routed to the physician or health care provider in step 1073.

Figure 13:
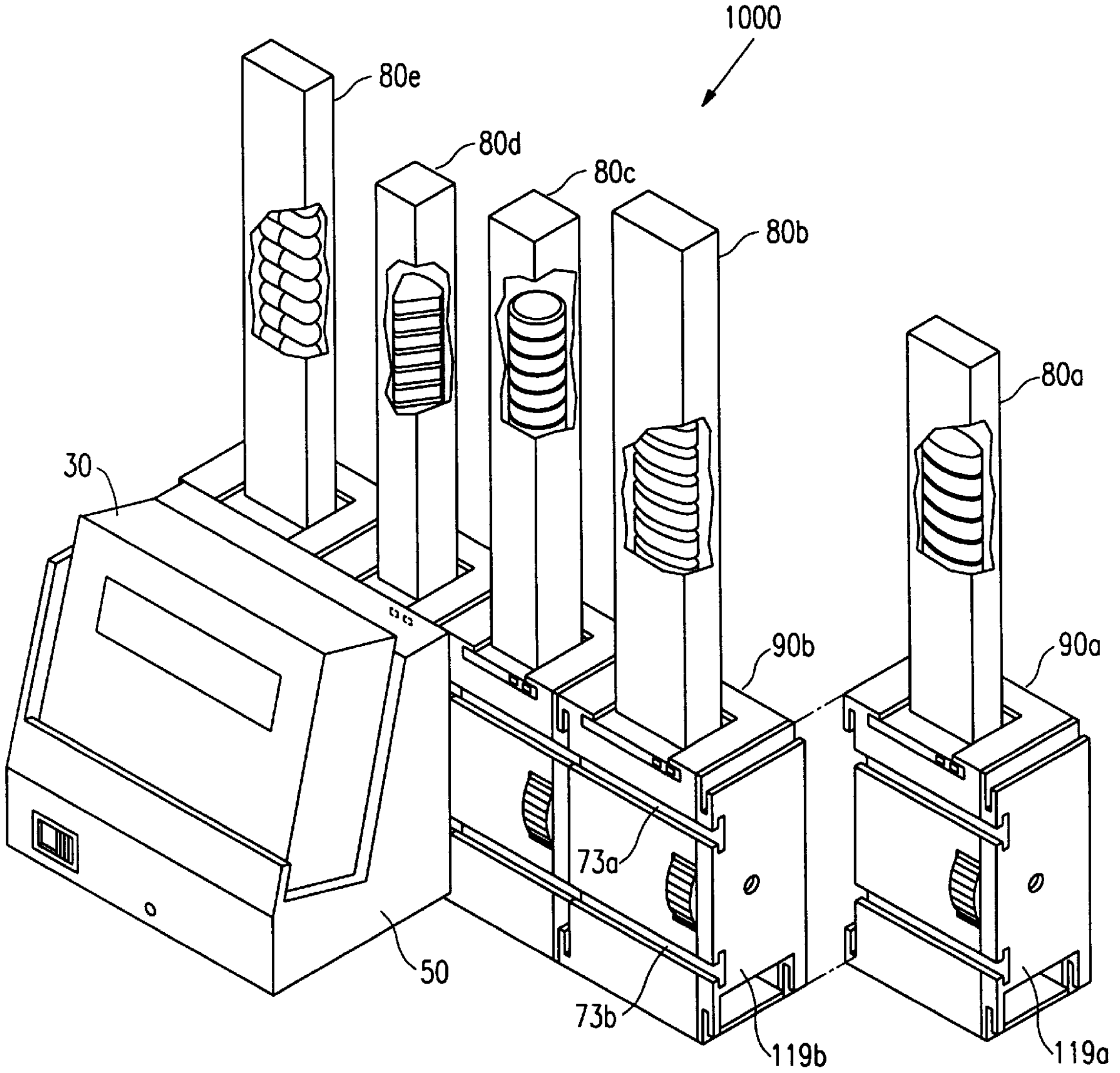
FIG. 13 is a perspective view of the pager, the carriage, and multiple medication units.

FIG. 13 illustrates a second embodiment of the medication dispensing and monitoring system of the present invention. In this embodiment, several medication units are linked together to form a medication unit assembly 1000. The assembly provides a unified solid storage and a portable system that the patient may easily transport in a purse or briefcase. The linking of medication units facilitates the dispensing of several types of medication. For instance, FIG. 13 shows canisters 70 of differing heights and shapes to accommodate various forms of medication. Moreover, patient compliance with more than one medication may be monitored.

Figure 14:
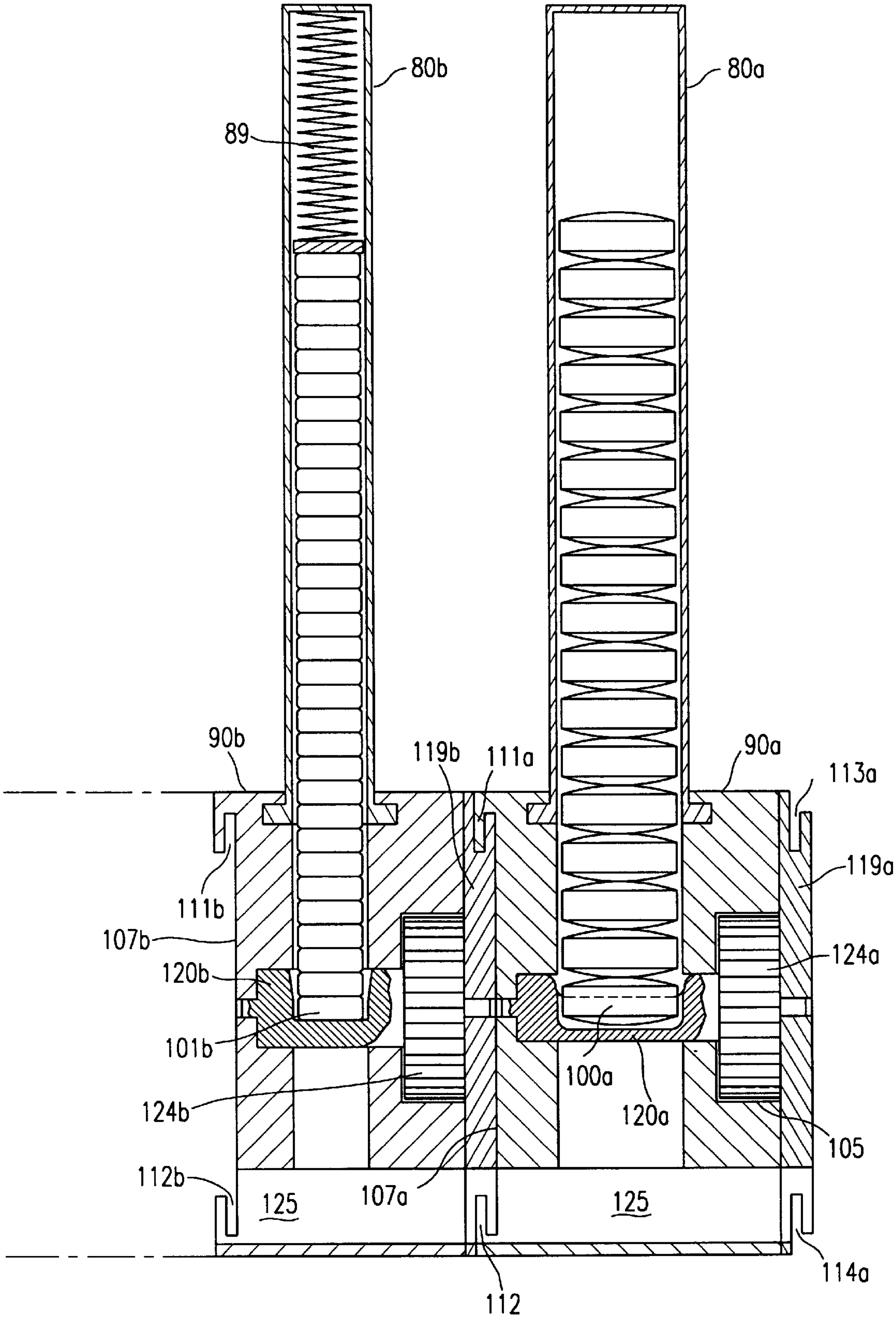
FIG. 14 is a front cut-away view of two medication units.

FIG. 14 is a cut-away view illustrating the coupling of two medication units. As shown, each canister accommodates a different pill. Each unit, however, includes the coupling bracket 119 for coupling a medication unit to an adjacent unit. The coupling bracket 119 includes grooves 113, 114 that slidably engage the flanges 111, 112 disposed along the side surface 107*a* of the base dispenser 90*a*. A collection of medication units form a medication unit assembly 1000. Dispensing similarly in each dispenser 90. Specifically, medication 100*a* is gravity-fed into a delivery drum 120*a* while medication 100*b* is fed via spring pressure to the delivery drum 120*b*. Rotation of the delivery drum actuator causes the delivery drum 120*a* to rotate and deliver the medication into the dispensing cavity (not shown). As the dispensing drum continues to rotate, an adjacent pill falls into the dispensing drum for dispensing.

Figure 3B:
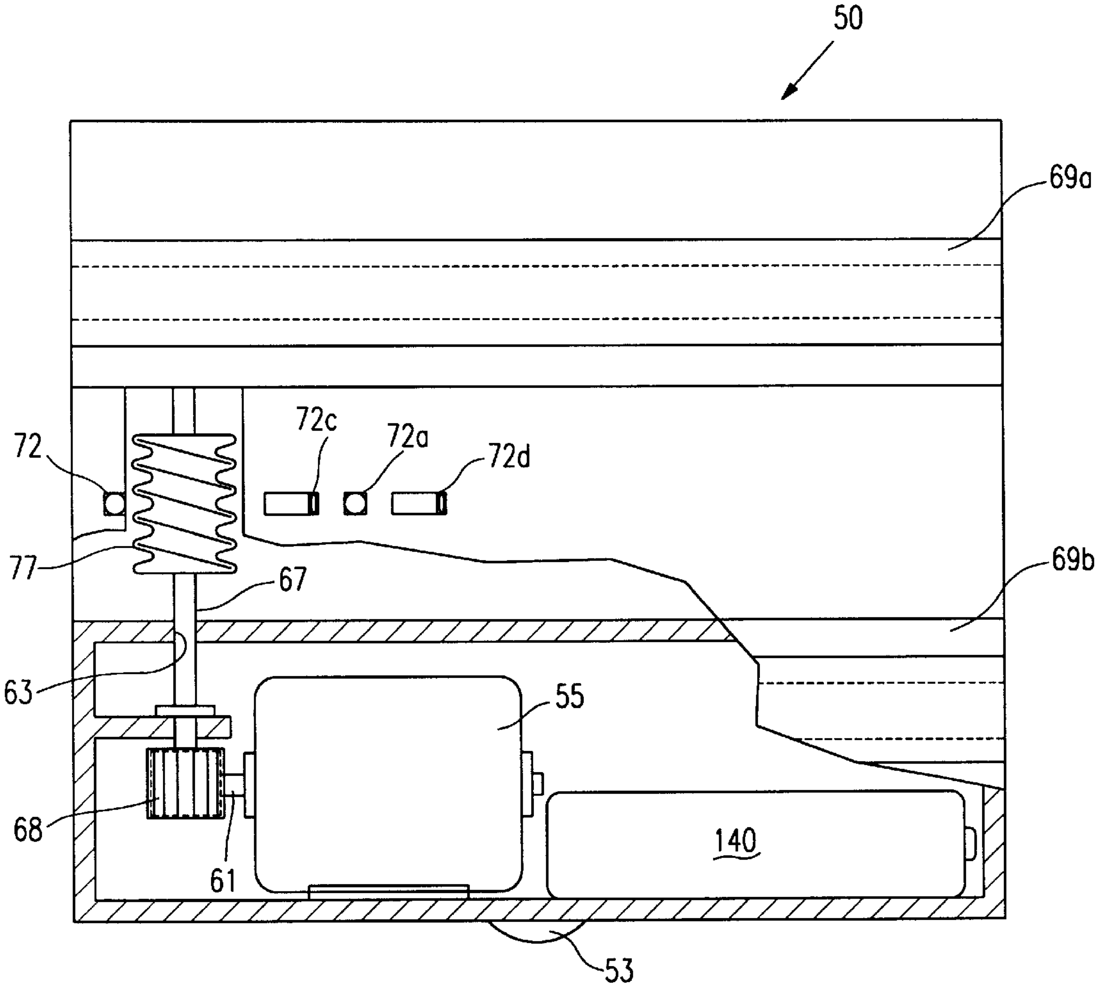
FIG. 3B is a view taken along the lines 3B—3B of FIG. 3A.
Figure 15:
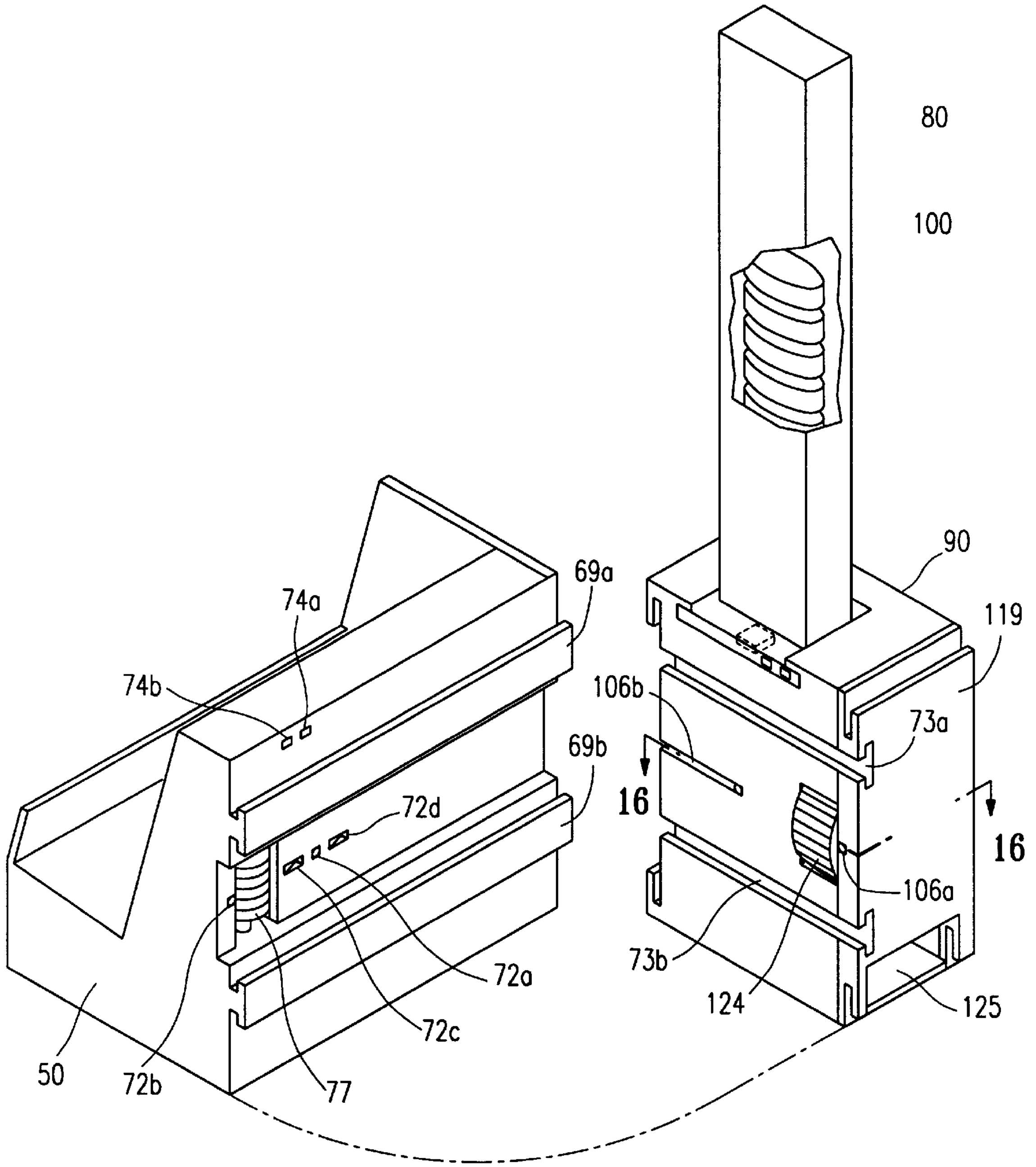
FIG. 15 is an exploded view of the carriage and a medication unit.

Medication unit assembly 1000 couples to the carriage 50 as shown in FIG. 15. Specifically, the grooves 73*a*, 73*b* of the medication units are combined together to form continuous grooves for the carriage rails 69*a*, 69*b*. The patient may manually engage the carriage 50 with the medication unit assembly 1000. The patient may then move the carriage 50 to the correct medication unit where the local ID is determined, as explained above. Alternatively, the assembly 1000 may be placed on a table and the carriage may then be fit into the medication assembly 1000. For support during lateral motion of the carriage 50 from one medication unit to the next, the carriage 50 may contain a small wheel 53 (see FIGS. 3A, 3B) that supports the weight of the carriage when placed on a flat surface. It should be apparent that the lateral movement of the carriage may be mechanized to move automatically from one medication to the next without patient intervention. Specifically, the carriage controller may be programmed to move the carriage 50 via an additional motor.

Figure 16:
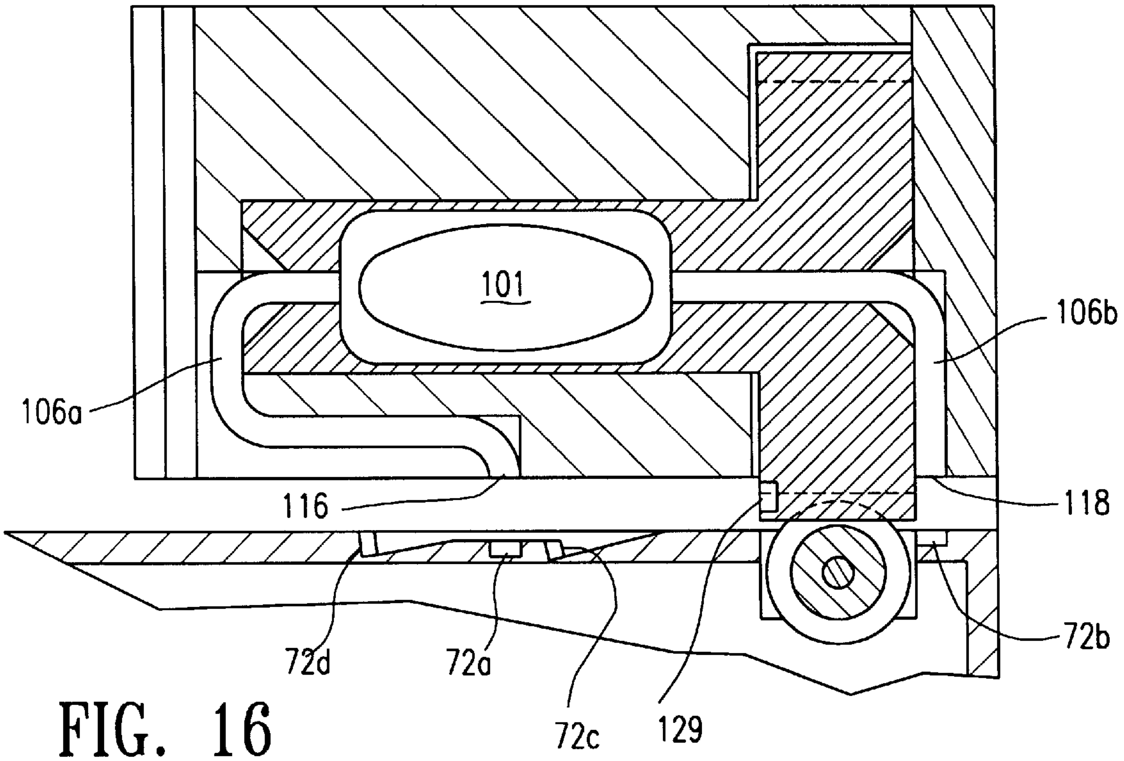
FIG. 16 is a view taken along the lines 16—16 of FIG. 15.
Figure 17:
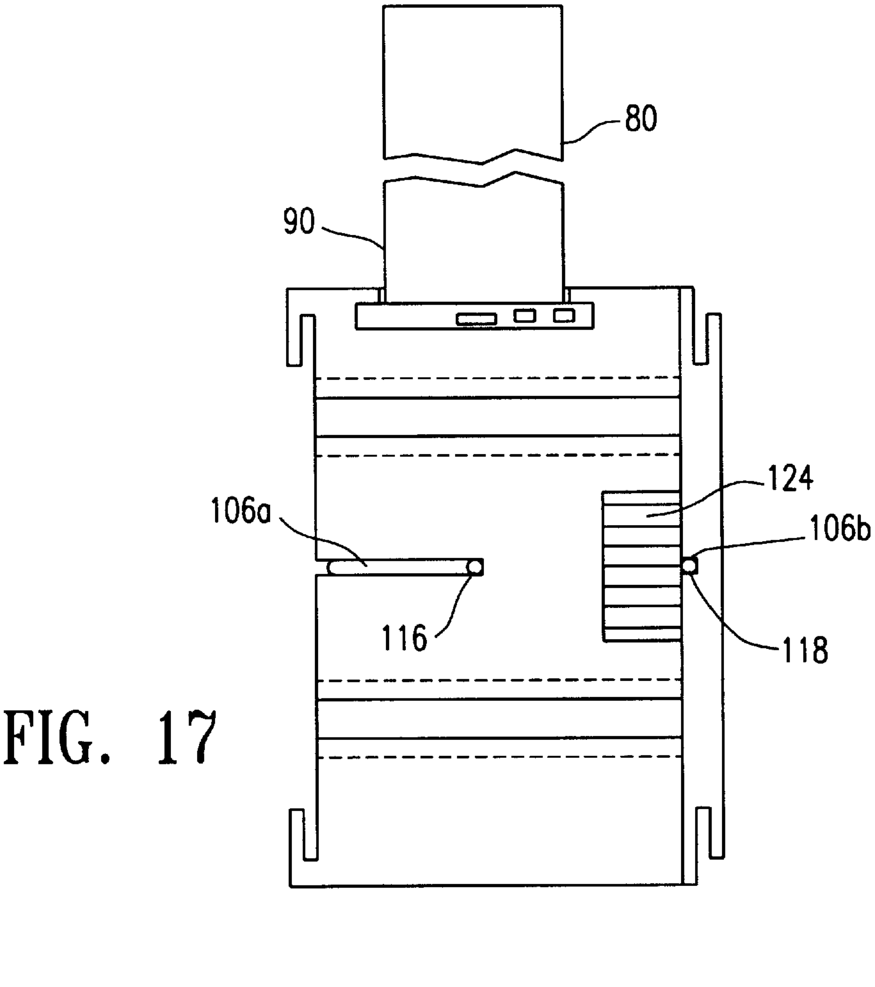
FIG. 17 is a front view of a medication unit.

The base dispenser 90 may further be provided with two light pipes 106*a,* 106*b* for determining whether medication is presently stored in the delivery drum 120. FIGS. 16 and 17 show the light pipes 106*a,* 106*b* in greater detail. The light pipes 106*a,* 106*b* are acrylic light pipes angled to provide a continuous path of light from a first entry point 116 at a fixed distance to a second entry point 118 proximate the delivery drum actuator 124. The distance from the first entry point 116 to the second entry point 118 is the same for each medication unit, regardless of the size of the medication unit. The carriage 70 includes a first light source 72*a,* e.g., LED, and a first detector 72*b* along a rear surface thereof to detect light from the first entry point 116 transmitted to the second entry point 118, respectively. When medication 100 is located within the delivery drum 120, the light path between the light pipes 106*a,* 106*b* is disrupted. When the delivery drum 120 is empty, however, the light passes from the first entry point 116 to the second entry point 118. This light presence is detected by the carriage detectors 72*b*. The detector 72*b* may be electrically coupled to the carriage controller 149 for use in dispensing operations, as described above. The light pipes 106*a,* 106*b* act as center axes about which the delivery drum 120 rotates.

In addition, a mechanism for detecting the completion of a full rotation of the medication delivery drum 120 may be provided. A small reflector 129 (see FIG. 3A) may be attached proximate the rim of the delivery drum actuator 124 to provide a line of sight to the reflector 129 from a second light source 72*c* and a second detector 72*d* (see FIG. 15). The reflector 129 may be composed, for example, of 2 mm round, reflective thin aluminum foil. The reflector 129 provides a strong signal to the detector 72*d* only when the delivery drum 120 is in one particular rotational position. FIG. 16 illustrates the relative position of the second light source 72*c* and the second detector 72*d.* The detector 72 may be electrically coupled to the carriage controller 149. During rotation of the delivery drum 120, the source 72*c* and detector 72*d* are activated. The controller may provide a drive command to the motor until the reflector 129 returns to the line of sight of the detector 72*d.*

Figure 18:
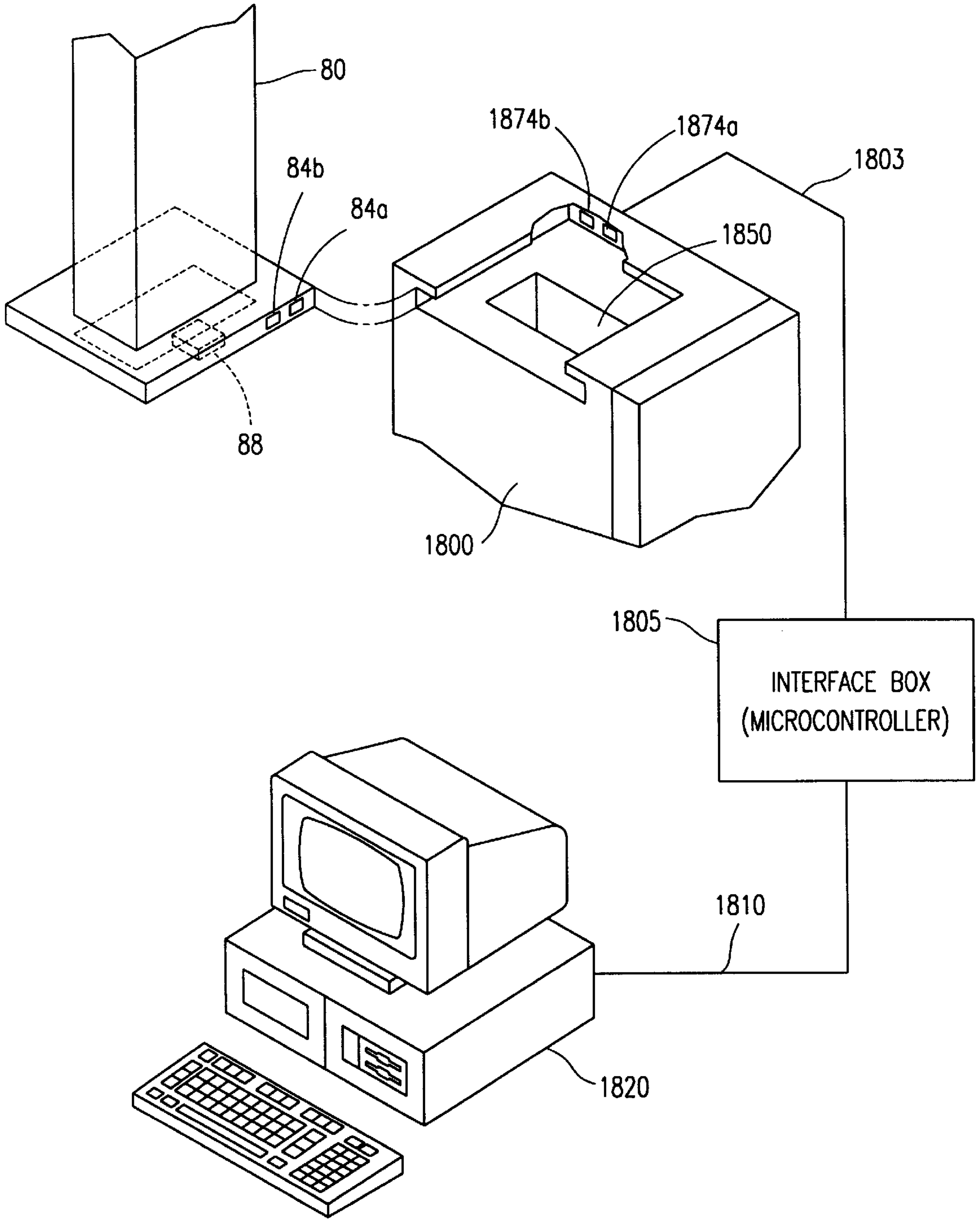
FIG. 18 is a perspective view of a canister information programmer.

FIG. 18 illustrates a canister programmer enabling the pharmacist or drug supplier to encode specific information (e.g., expiration date, manufacturing lot number, amount loaded). using an NVRAM or EPRON version of the ID chip 88 as described above. The encoded information may be read by the carriage controller or the pager and may be used in the dispensing procedure for the patient. The canister 80 slidably engages into a mating adaptor 1800. Contacts 84*a,* 84*b* are electrically coupled to contacts 1874*a,* 1874*b* in the adaptor 1800. A cable 1803 connects the adaptor 1800 to an interface box 1805 containing a microcontroller that communicates with the programmable ID chip 88. The microcontroller 1805 may be used to read or write information to the chip 88. The interface box 1805 is connected via a cable 1810 to a computer 1820 that provides a simple user interface for inputting the data. The adaptor 1800 may be connected directly to a port on the computer 1820. The adaptor 1800 further includes an opening 1850 that may be used in connection with an automatic filling station for the canister 80. When the adaptor 1800 is coupled to an automatic filling station, medication may be provided to the canister 80 through the opening 1850.

Using the programmable version of the ID chip 88, consumption of medication may be subtracted from an initial value such that the canister will contain updated quantity information about its medication content. The carriage controller or the pager reads the quantity stored prior to dispensing. Following dispensing, the controller or pager writes back the correct amount. This method may be used when the patient desires to tracking compliance of over-the-counter medication.

Having thus described a preferred embodiment of a remote medication dispensing and monitoring system, it should be apparent to those skilled in the art that certain advantages of the within system have been achieved. It should also be appreciated that various modifications, adaptations, and alternative embodiments thereof may be made within the scope and spirit of the present invention. For example, manual lateral carriage operation has been illustrated, but it should be apparent that the inventive concepts described above would be equally applicable to mechanical transport of the carriage 50 between different medication units. In addition, the delivery drum 120 may be rotated several times for prescriptions requiring greater than one pill. The invention is further defined by the following claims.

What is claimed is:

1. A medication dispensing system comprising:

a pager operatively in communication with a transmitter;

a medication unit, including an apparatus for dispensing stored medication, and communicatively coupled to the pager;

a memory storing prescription and dispensing time information; and a medication unit processor responsive to dispensing of medication from the medication dispensing system, coupled for data communication with the pager transmitter, the memory and the medication unit, for determining if medication in accordance with the stored prescription information is retrieved from the medication unit in accordance with the stored dispensing time and if not the transmitter initiating an outgoing page notifying noncompliance from the pager.

2. The medication dispensing system, as recited in claim 1, wherein the medication unit is detachably coupled to the pager.

3. The medication dispensing system, as recited in claim 1, wherein the medication unit processor is coupled to the pager via an infrared transmitter.

4. The medication dispensing system, as recited in claim 1, wherein the pager is an acknowledge-back pager.

5. The medication dispensing system, as recited in claim 1, wherein the pager includes a paging circuit comprising:

means for receiving a packet message including said prescription and dispensing time information;

and wherein the processor is coupled to the receiving means.

6. The medication dispensing system, as recited in claim 5, further comprising means for transmitting a packet message.

7. The medication dispensing system, as recited in claim 5, wherein the packet message receiving means further comprises:

an antenna;

an antenna switch coupled to the antenna; and a message receiver coupled to the antenna switch.

8. A medication dispensing system, comprising:

a wireless communication device including a transmitter;

a first medication unit including a canister for storing a first medication and a first coupling bracket coupled to a surface of the medication unit;

a second medication unit having a second coupling bracket removably engaged with the first medication unit via the first coupling bracket, a third coupling bracket for receiving an additional medication unit, and a second canister for storing a second medication; and a processor, coupled for data communication with the communication device, for controlling and monitoring the first and second medication units based on prescription information received from the communication device.

9. The medication dispensing system, as recited in claim 8, wherein the medication unit further comprises:

a base medication dispenser removably engaged with the canister.

10. The medication dispensing system, as recited in claim 9, wherein the base medication dispenser further comprises:

delivery means for receiving medication from the canister;

an actuator coupled to the delivery means; and a dispensing cavity disposed proximate the delivery means.

11. The medication dispensing system, as recited in claim 10, further comprising a carriage having a carriage circuit for controlling operation of the carriage.

12. The medication dispensing system, as recited in claim 11, wherein the carriage circuit further comprises:

a power source;

a motor driver coupled to the power source; and means for controlling operation of the carriage.

13. The medication dispensing system, as recited in claim 12, wherein the carriage further comprises:

a motor driven by the motor driver; and at least one gear rotated by the motor and rotatably coupled to the delivery drum actuator.

14. The medication dispensing system, as recited in claim 12, wherein the means for controlling operation of the carriage comprises a controller implemented at least in part by software stored in nonvolatile memory.

15. The medication dispensing system, as recited in claim 12, wherein the controlling means further comprises a carriage read-only memory storing dispensing operations.

16. The medication dispensing system, as recited in claim 11, further comprising means for detecting a presence of the medication in the delivery means.

17. The medication dispensing system, as recited in claim 16, wherein the base medication dispenser includes a first entrance and a second entrance and wherein the detecting means further comprises:

a first light pipe extending from a first entrance of the base medication dispenser to a first end of the delivery drum;

a second light pipe extending from a second entrance of the base dispenser to a second end of the delivery means; and disposed within the base medication dispenser;

a first detector disposed on a surface of the carriage proximate the first entrance; and a second detector disposed on the surface of the carriage proximate the second entrance.

* * * * *